(12) United States Patent
Yang et al.

(10) Patent No.: US 8,077,275 B2
(45) Date of Patent: Dec. 13, 2011

(54) DISPLAY SUBSTRATE AND A METHOD OF MANUFACTURING THE SAME

(75) Inventors: Byung-Duk Yang, Yongin-si (KR); Jang-Soo Kim, Yongin-si (KR); Woo-Geun Lee, Yongin-si (KR); Ki-Won Kim, Suwon-si (KR); Sang-Ki Kwak, Cheonan-si (KR); Hyang-Shik Kong, Seongnam-si (KR); Sang-Hun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 394 days.

(21) Appl. No.: 12/408,213

(22) Filed: Mar. 20, 2009

(65) Prior Publication Data
US 2010/0079710 A1   Apr. 1, 2010

(30) Foreign Application Priority Data

May 9, 2008 (KR) .......... 10-2008-0043306
Jun. 5, 2008 (KR) .......... 10-2008-0052976

(51) Int. Cl.
*G02F 1/1339* (2006.01)
*G02F 1/1335* (2006.01)

(52) U.S. Cl. .......... 349/106; 349/156

(58) Field of Classification Search .......... 349/42, 349/46, 110, 106, 156, 187, 153, 141; 257/59, 257/72, E29.003, E21.7
See application file for complete search history.

(56) References Cited

U.S. PATENT DOCUMENTS 6,008,877 A * 12/1999 Akiyama et al. .......... 349/147
7,639,333 B2 * 12/2009 Do et al. .......... 349/129
2005/0151898 A1 * 7/2005 Yi et al. .......... 349/106
2005/0264722 A1 * 12/2005 Choi .......... 349/110
2006/0109413 A1 * 5/2006 Lee .......... 349/153
2009/0090911 A1 * 4/2009 Choi et al. .......... 257/59
2009/0173947 A1 * 7/2009 Kim .......... 257/72
2010/0033646 A1 * 2/2010 Baek et al. .......... 349/42
2010/0065850 A1 * 3/2010 Kwak et al. .......... 257/72

FOREIGN PATENT DOCUMENTS

| JP | 10-073809 | 3/1998 |
| JP | 2005-070442 | 3/2005 |
| JP | 2005-241826 | 8/2005 |
| JP | 2007-206532 | 8/2007 |
| KR | 1020020032088 | 5/2002 |

* cited by examiner

*Primary Examiner* — Akm Ullah
(74) *Attorney, Agent, or Firm* — F. Chau & Associates, LLC

(57) ABSTRACT

A display substrate includes a transistor layer, a plurality of color filters, a first blocking member, a supporting member, a circuit part, a second blocking member and a protruding member. The first blocking member is disposed between different color filters. The supporting member maintains a distance between a base substrate and a substrate facing the base substrate. A circuit part is disposed in a peripheral area surrounding a display area, and the circuit part includes a metal pattern and a contact electrode in contact with the metal pattern. The second blocking member includes substantially the same material as the first blocking member and the second blocking member covers the circuit part. The protruding member includes substantially the same material as the second blocking member, and is integrally formed with the second blocking member.

30 Claims, 15 Drawing Sheets

DISPLAY SUBSTRATE AND A METHOD OF MANUFACTURING THE SAME

CROSS-REFERENCE TO RELATED APPLICATION

This application claims priority under 35 U.S.C. §119 to Korean Patent Application No. 2008-43306, filed on May 9, 2008 and Korean Patent Application No. 2008-52976, filed on Jun. 5, 2008 in the Korean Intellectual Property Office (KIPO), the disclosures of which are incorporated by reference herein in their entirety.

BACKGROUND OF THE INVENTION

1. Technical Field

The present invention relates to a display substrate for a liquid crystal display (LCD) apparatus, and a method of manufacturing the display substrate.

2. Discussion of the Related Art

In general, a liquid crystal display (LCD) panel includes an array substrate including a plurality of thin-film transistors (TFTs), a color filter substrate facing the array substrate and having a color filter, and a liquid crystal layer interposed between the array substrate and the color filter substrate.

A color filter on array (COA) substrate, which includes a color filter formed on an array substrate including thin-film transistors (TFTs), has been developed to improve an aperture ratio of an LCD panel. The COA substrate includes a TFT layer disposed on a base substrate, a color filter layer disposed on the TFT layer and having a contact hole, and a pixel electrode connected to a TFT of the TFT layer through the contact hole. An opposing substrate facing the COA substrate has a blocking member (e.g., a black matrix) and a common electrode corresponding to the pixel electrode.

A black matrix on array (BOA) substrate, which includes a black matrix formed on a COA substrate, has been developed to prevent misalignment that may occur when coupling the COA substrate with an opposing substrate having a black matrix.

The BOA substrate may reduce defects resulting from such misalignment. However, since a color filter and a black matrix are formed on an array substrate having a TFT layer, a column spacer is used to maintain a gap between the BOA substrate and an opposing substrate. As a consequence, a method of manufacturing the BOA substrate may be complicated.

Accordingly, there is a need for simplifying the manufacturing process of a display substrate.

SUMMARY OF THE INVENTION

In an exemplary embodiment of the present invention, a display substrate includes a transistor layer, a plurality of color filters, a first blocking member, a supporting member, a circuit part, a second blocking member and a protruding member. The transistor layer includes a transistor connected to a gate line and a data line crossing the gate line, wherein the transistor is disposed in a display area of a base substrate. The color filters are disposed on the transistor layer and are formed in a pixel area of the base substrate. The first blocking member is disposed between different color filters, wherein the first blocking member blocks light. The supporting member maintains a distance between the base substrate and a substrate facing the base substrate, and the supporting member includes a blocking member including substantially the same material as the first blocking member. The circuit part is disposed in a peripheral area surrounding the display area, and the circuit part includes a metal pattern and a contact electrode in contact with the metal pattern. The second blocking member includes substantially the same material as the first blocking member, and the second blocking member covers the circuit part. The protruding member includes substantially the same material as the second blocking member and is integrally formed with the second blocking member.

A thickness of the supporting member is substantially similar to or greater than a thickness of the first blocking member.

The second blocking member directly covers the circuit part.

The circuit part further includes a static electricity prevention circuit.

The circuit part further includes a gate driving circuit.

The display substrate further comprises a dummy color filter disposed between the base substrate and the second blocking member and having an opening in an area in which the circuit part is formed.

The protruding member comprises substantially the same material as at least one of the color filters.

The protruding member is disposed between the second blocking member and the dummy color filter.

The supporting member comprises substantially the same material as at least one of the color filters, and the supporting member includes a color pattern disposed between the blocking member thereof and at least one of the color filters.

The display substrate further comprises: a capping layer covering an upper face and a side face of the color filters; and a pixel electrode directly disposed on the capping layer, wherein the first blocking member is disposed on the capping layer between different color filters, and an end of the pixel electrode is overlapped with the first blocking member.

The supporting member is disposed on the capping layer in an area in which at least one of the color filters is formed.

In an exemplary embodiment of the present invention, there is provided a method of manufacturing a display substrate. In the method, a transistor layer is formed in a display area of a base substrate, and a circuit layer is formed in a peripheral area surrounding the display area, wherein the transistor layer includes a transistor connected to a gate line and a data line crossing the gate line, and the circuit layer includes a metal pattern of a circuit part. A plurality of color filters is formed on the transistor layer in a pixel area of the base substrate. A first blocking member is formed between different color filters, a supporting member is formed on at least one of the color filters, and a second blocking member is formed to cover the circuit part.

The method further comprises forming a pixel electrode on at least one of the color filters and a contact electrode in contact with the metal pattern, before forming the first blocking member, the supporting member and the second blocking member.

The second blocking member is integrally formed with a protruding member.

Forming the first blocking member, the supporting member, the second blocking member and the protruding member comprises: forming a blocking layer on the base substrate having the pixel electrode and the contact electrode formed thereon; and patterning the blocking layer using a mask, wherein the mask includes a transmissive part disposed corresponding to the protruding member and the supporting member, and a slit part disposed corresponding to the first blocking member and the second blocking member covering the circuit part.

The method further comprises forming a dummy color filter between the base substrate and the second blocking member, wherein the dummy color filter has an opening corresponding to an area in which the circuit part is formed.

The second blocking member is integrally formed with a protruding member, and the second blocking member covers the circuit part through the opening.

Forming the first blocking member, the supporting member, the second blocking member and the protruding member comprises: forming a blocking layer on the base substrate having the pixel electrode and the contact electrode formed thereon; and patterning the blocking layer using a mask, wherein the mask includes a transmissive part disposed corresponding to the protruding member and the supporting member, and a slit part disposed corresponding to the first blocking member and the second blocking member covering the circuit part.

The method further comprises forming a color protruding member on the dummy color filter.

The second blocking member covers the color protruding member and the dummy color filter, and the second blocking member covers the circuit part through the opening.

Forming the first blocking member, the supporting member, the second blocking member and the color protruding member comprises: forming a blocking layer on the base substrate having the pixel electrode and the contact electrode formed thereon; and patterning the blocking layer using a mask, wherein the mask includes a transmissive part disposed corresponding to the supporting member, and a slit part disposed corresponding to the first blocking member, the color protruding member and the second blocking member covering the dummy color filter.

Forming the color protruding member comprises forming a color supporting member on at least one of the color filters.

Forming the second blocking member comprises forming a blocking member on the color supporting member to form the supporting member.

The method further comprises: forming a capping layer on the base substrate having the color filters formed thereon, wherein the capping layer covers an upper face and a side face of the color filters; and forming a pixel electrode on the base substrate having the first blocking member and the supporting member formed thereon, wherein the pixel electrode is directly disposed on the capping layer, and wherein the first blocking member is disposed on the capping layer between different color filters, and an end of the pixel electrode is overlapped with the first blocking member.

The supporting member is formed on the capping layer in an area in which at least one of the color filters is formed.

Forming the transistor layer comprises: forming the gate line on the base substrate; forming a gate insulation layer on the base substrate having the gate line formed thereon; forming the data line crossing the gate line, a source electrode connected to the data line and a drain electrode spaced apart from the source electrode on the base substrate having the gate insulation layer formed thereon; and forming a protective layer on the base substrate having the drain electrode formed thereon.

Forming at least one of the color filters comprises forming an opening exposing the protective layer in an area in which the drain electrode is formed.

The method further comprises etching the protective layer and the capping layer corresponding to the opening to form a contact hole exposing the drain electrode, wherein the pixel electrode is electrically connected to the drain electrode through the contact hole.

The contact hole is formed before the supporting member is formed.

The pixel electrode includes a first sub-electrode and a second sub-electrode spaced apart from the first sub-electrode.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Exemplary embodiments of the invention are described more fully hereinafter with reference to the accompanying drawings. This invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
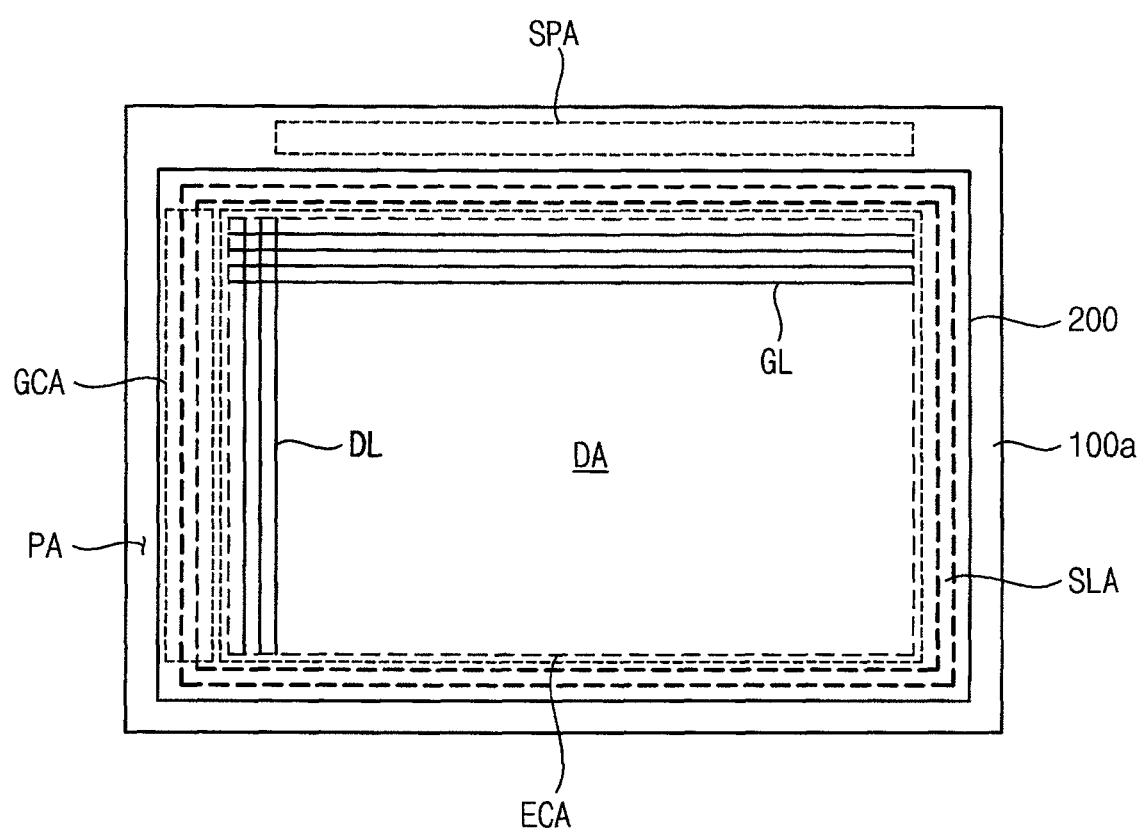
FIG. 1 is a plan view illustrating a display panel according to an exemplary embodiment of the present invention.

FIG. 1 is a plan view illustrating a display panel according to an exemplary embodiment of the present invention.

Referring to FIG. 1, a display panel includes a display substrate 100a, an opposing substrate 200 facing the display substrate 100a, and a liquid crystal layer disposed between the display substrate 100a and the opposing substrate 200.

The display substrate 100a includes a display area DA and a peripheral area PA surrounding the display area DA. The display area DA includes a plurality of gate lines GL, a plurality of data lines DL crossing the gate lines GL, and a plurality of pixels.

The peripheral area PA includes a source pad area SPA, a static electricity circuit area ECA, a gate circuit area GCA, and a seal line area SLA. A plurality of input pads receiving signals for driving the display panel and a plurality of output pads outputting data signals to the data lines DL are disposed in the source pad area SPA. The source pad area SPA is defined in the peripheral area PA corresponding to ends of the data lines DL.

A plurality of static electricity diodes are disposed on the static electricity circuit area ECA, and the static electricity diodes protect the pixels formed in the display area DA from static electricity. For example, static electricity generated in the course of manufacturing of the display substrate 100a may be offset by the static electricity diodes so that the static electricity diodes protect a transistor of the display area DA from static electricity. The static electricity circuit area ECA is defined in the peripheral area PA adjacent to the display area DA.

A gate driving circuit is disposed in the gate circuit area GCA, and the gate driving circuit outputs gate signals to the gate lines GL. The gate circuit area GCA is defined in the peripheral area PA corresponding to ends of the gate lines GL.

A sealant is disposed in the seal line area SLA, and the sealant couples the display substrate 100a with the opposing substrate 200. For example, the seal line area SLA may be defined in the gate circuit area GCA to overlap with the gate circuit area GCA. Thus, the capacitance between the gate driving circuit and a common electrode layer of the opposing substrate 200 may be decreased by the sealant.

Figure 2:
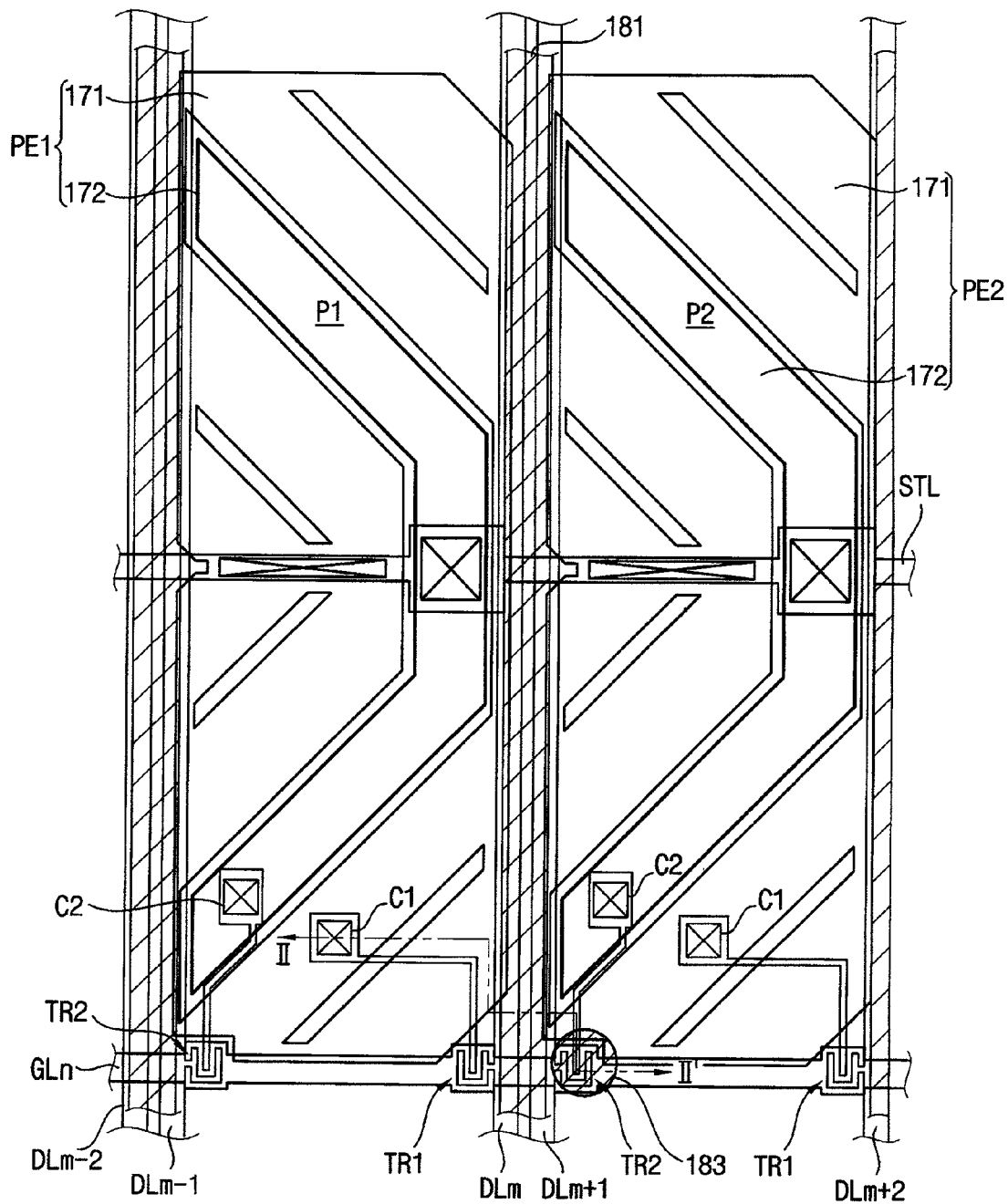
FIG. 2 is an enlarged plan view illustrating a display area of the display panel in FIG. 1.
Figure 3:
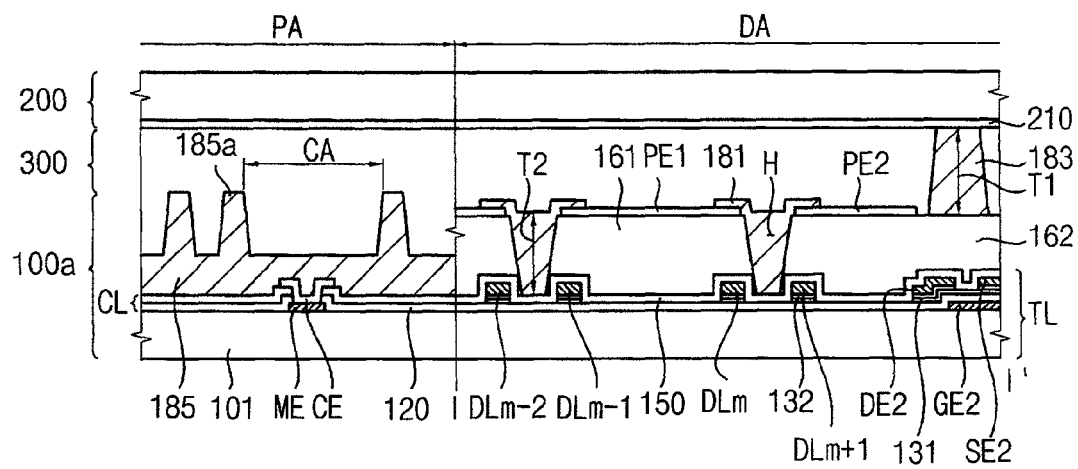
FIG. 3 is a cross-sectional view taken along line I-I' in FIG. 2.

FIG. 2 is an enlarged plan view illustrating a display area of the display panel illustrated in FIG. 1. FIG. 3 is a cross-sectional view taken along line I-I' in FIG. 2.

Referring to FIGS. 1, 2 and 3, the display panel includes the display substrate 100a, the opposing substrate 200, and liquid crystal layer 300. The opposing substrate 200 includes the common electrode layer 210.

The display substrate 100a includes a base substrate 101. The base substrate 101 includes the display area DA and the peripheral area PA surrounding the display area DA.

A transistor layer TL, a plurality of color filters 161 and 162, a plurality of pixel electrodes PE1 and PE2, a first blocking member 181 and a supporting member 183 are formed in the display area DA.

The transistor layer TL includes a gate metal pattern formed on the base substrate 101, a gate insulation layer 120, a plurality of channel patterns 131 and 132, a source metal pattern and a protective layer 150. The gate metal pattern includes a plurality of gate lines GLn (where n is natural number), a plurality of gate electrodes GE1 and GE2, and a storage line STL. An n-th gate line GLn is extended in a first direction. The gate electrodes GE1 and GE2 are formed together with the n-th gate line GLn. A gate electrode GE1 of a first transistor TR1 and a gate electrode GE2 of a second transistor TR2 are defined with the n-th gate line GLn. The storage line STL may be formed in parallel with the n-th gate line GLn.

The gate insulation layer 120 is formed on the gate metal pattern. The channel patterns 131 and 132 are disposed in an area in which the source metal pattern is formed. For example, a first channel pattern 131 may be disposed in an area in which source and drain electrodes SE1, SE2, DE1 and DE2 are formed. The source and drain electrodes SE1, SE2, DE1 and DE2 are disposed on the gate electrodes GE1 and GE2. The second channel pattern 132 is disposed in an area in which the data lines DLm−2, DLm−1, DLm, DLm+1 and DLm+2 are formed. The first and second channel patterns 131 and 132 include an active layer and an ohmic contact layer.

The source metal pattern includes a plurality of data lines DLm−2, DLm−1, DLm, DLm+1 and DLm+2, the source electrodes SE1 and SE2, and the drain electrodes DE1 and DE2. The data lines DLm−2, DLm−1, DLm, DLm+1 and DLm+2 are extended in a second direction crossing the n-th gate line GLn. The source electrodes SE1 and SE2 are protruded from the data lines DLm−2, DLm−1, DLm, DLm+1 and DLm+2 to overlap with the gate electrodes GE1 and GE2. The drain electrodes DE1 and DE2 are overlapped with the gate electrodes GE1 and GE2 to be spaced apart from the source electrodes SE1 and SE2. First and second contact holes C1 and C2 are respectively formed on ends of the drain electrodes DE1 and DE2, so that the ends of the drain electrodes DE1 and DE2 are electrically connected to the pixel electrodes PE1 and PE2 through the first and second contact holes C1 and C2.

The protective layer 150 is formed on the base substrate 101 having the source metal pattern formed thereon. The protective layer 150 protects the channel pattern 131 of the first and second transistors TR1 and TR2, and the source metal pattern from the exterior.

The color filters 161 and 162 are formed on the transistor layer TL corresponding to pixel areas P1 and P2 of the base substrate 101, respectively. The first color filter 161 has a first color, and the second color filter 162 has a second color different from the first color. An opening H is formed on a boundary area of the first and second color filters 161 and 162 to expose the protective layer 150. For example, the color filters 161 and 162 between the pixel areas P1 and P2 may be removed to form the opening H between m-th data line DLm and (m+1)-th data line DLm+1. A plurality of openings may be further formed in an area in which the first and second contact holes C1 and C2, and the storage line STL are formed.

The pixel electrodes PE1 and PE2 are formed in the pixel areas P1 and P2, and the pixel electrodes PE1 and PE2 are divided into a first sub-electrode 171 and a second sub-electrode 172 for dividing the domains of the liquid crystal layer 300, respectively.

As shown, the first and second sub-electrodes 171 and 172 may be patterned into a chevron shape. The first sub-electrode 171 is electrically connected to the drain electrode DE1 of the first transistor TR1 through the first contact hole C1. The second sub-electrode 172 is electrically connected to the drain electrode DE2 of the second transistor TR2 through the second contact hole C2.

The first blocking member 181 is disposed in the opening H formed on the boundary area of the pixel areas P1 and P2. The first blocking member 181 divides the pixel areas P1 and P2 having different color filters 161 and 162. The first blocking member 181 includes a light-blocking material.

The supporting member 183 is formed on the color filter 162 to maintain a gap between the display substrate 100a and the opposing substrate 200. For example, the supporting member 183 may be formed on the color filter 162 corresponding to the n-th gate line GLn. Alternatively, the supporting member 183 may be formed in an area in which the gate metal pattern and the source metal pattern are formed. The supporting member 183 includes substantially the same material as the first blocking member 181. A thickness T1 of the supporting member 183 may be similar to a thickness T2 of the first blocking member 181, or may be greater than the thickness T2 of the first blocking member 181.

A circuit layer CL, a contact electrode CE and a second blocking member 185 are formed in the peripheral area PA.

The circuit layer CL includes a metal pattern ME, the gate insulation layer 120 and the protective layer 150 for forming a static electricity prevention circuit or a gate driving circuit. The metal pattern ME includes the gate metal pattern and the source metal pattern.

The contact electrode CE is electrically connected to the metal pattern ME of the circuit layer CL. The contact electrode CE includes substantially the same material as the pixel electrodes PE1 and PE2.

The second blocking member 185 is formed on the circuit layer CL to make direct contact with the contact electrode CE. The second blocking member 185 includes substantially the same material as the first blocking member 181 and the supporting member 183. The second blocking member 185 protects the circuit layer CL, and the second blocking member 185 blocks light reflected from the metal pattern ME and the contact electrode CE to prevent light leakage. The second blocking member 185 may further include a plurality of protruding members 185a as shown. The protruding members 185a may decrease the volume of the liquid crystal layer 300 disposed in the peripheral area PA. Thus, the filling characteristics of the liquid crystal layer 300 in consideration of the drop margin of liquid crystal may be improved.

Figure 4A:
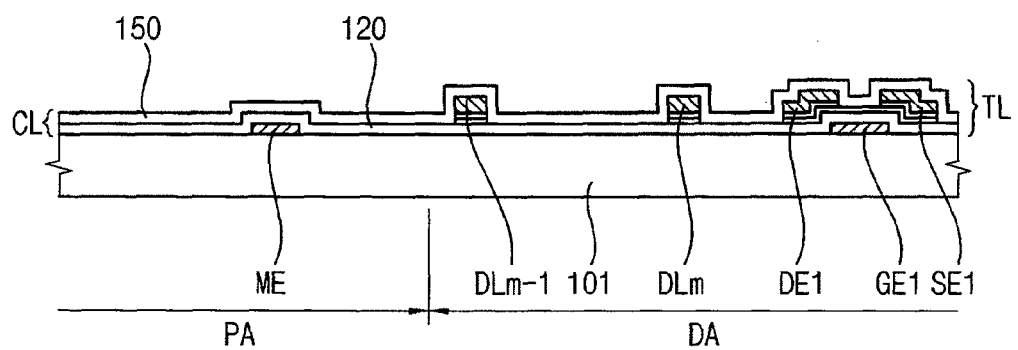
FIGS. 4A to 4C are cross-sectional views illustrating a method for manufacturing a display substrate illustrated in FIG. 3, according to an exemplary embodiment of the present invention.
Figure 4B:
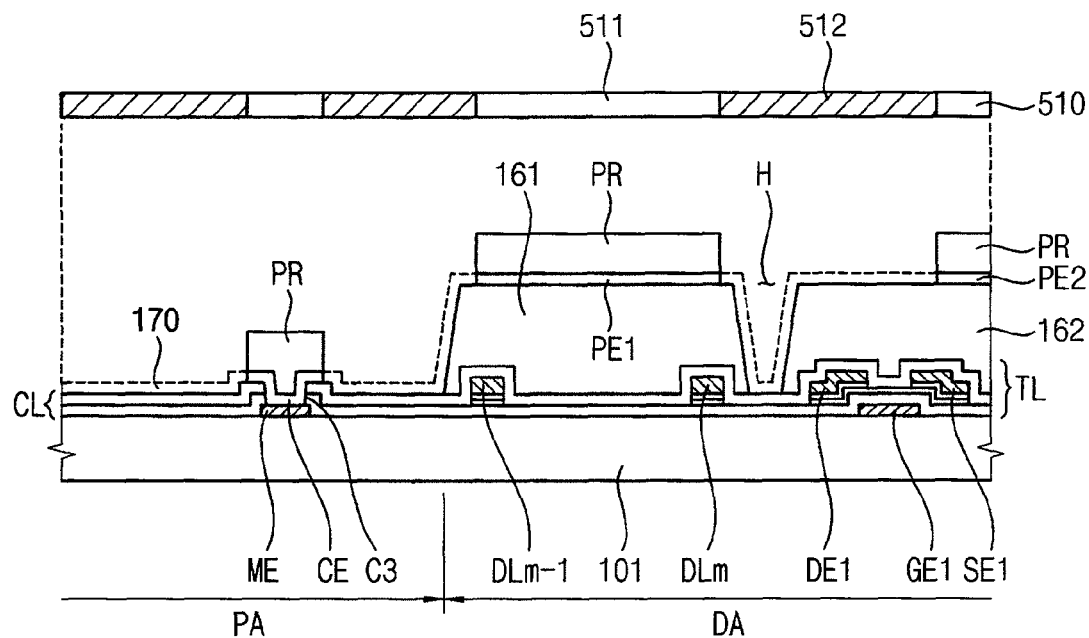
Figure 4C:
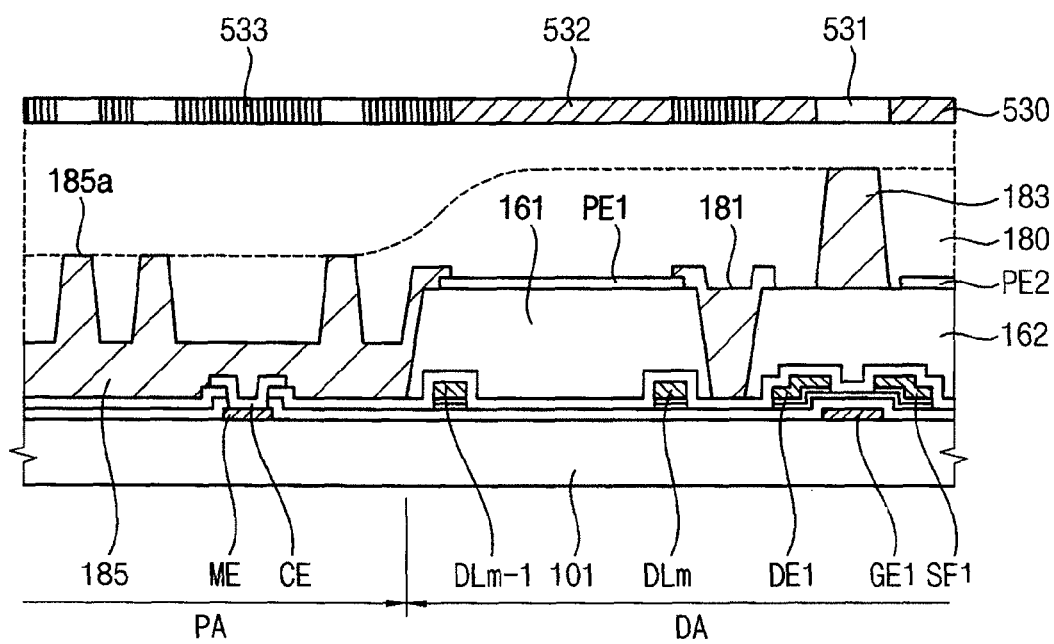

FIGS. 4A to 4C are cross-sectional views illustrating a method for manufacturing the display substrate 100a illustrated in FIG. 3, according to an exemplary embodiment of the present invention.

Referring to FIGS. 2, 3 and 4A, the transistor layer TL is formed in the display area DA of the base substrate 101, and the circuit layer CL is formed in the peripheral area PA of the base substrate 101.

For example, a gate metal layer may be formed on the base substrate 101. The gate metal layer is patterned to form the gate metal pattern. The gate metal pattern includes the n-th gate line GLn, the gate electrodes GE1 and GE2, and the storage line STL. The gate metal pattern includes the metal pattern ME formed in the peripheral area PA. The gate insulation layer 120 is formed on the base substrate 101 having the gate metal pattern formed thereon.

A channel layer and a source metal layer are sequentially formed on the base substrate 101 having the gate insulation layer 120. The channel layer and the source metal layer are patterned by using one mask to form the source metal pattern disposed on the gate insulation layer 120 and the channel patterns 131 and 132 disposed under the source metal pattern.

The source metal pattern includes the data lines DLm−1 and DLm, the source electrodes SE1 and SE2, and the drain electrodes DE1 and DE2 in the display area DA. The first channel pattern 131 is formed under the source electrodes SE1 and SE2, and the drain electrodes DE1 and DE2. The second channel pattern 132 is formed under the data lines DLm−1 and DLm. The source metal pattern includes the metal pattern ME forming the static electricity prevention circuit and the gate driving circuit formed in the peripheral area PA.

The protective layer 150 is formed on the base substrate 101 having the source metal pattern. Thus, the transistor layer TL is formed in the display area DA, and the circuit layer CL is formed in the peripheral area PA.

Referring to FIGS. 2, 3 and 4B, the color filters 161 and 162 are formed on the base substrate 101 having the transistor layer TL and the circuit layer CL. For example, a first color filter 161 having a first color may be formed on a first pixel area P1. After the first color filter 161 is formed, a second color filter 162 having a second color is formed on a second pixel area P2. The opening H is formed on the boundary area between the first and second pixel areas P1 and P2 having different color filters 161 and 162. The color filters 161 and 162 on the boundary area are removed to form the opening H. The opening H is extended in the second direction to be formed parallel with the data lines DLm−1 and DLm.

A plurality of openings may be further formed through the color filters 161 and 162 in an area in which the first and second contact holes C1 and C2 are formed. The plurality of openings exposes the protective layer 150.

The color filters 161 and 162 are formed in the display area DA; however, the color filters 161 and 162 are not formed in the peripheral area PA.

Next, the protective layer 150 of the base substrate 101 is etched to form the first and second contact holes C1 and C2 exposing the drain electrodes DE1 and DE2. The protective layer 150 and the gate insulation layer 120 formed in the peripheral area PA are etched to form a third contact hole C3 exposing the metal pattern ME.

A transparent conductive layer 170 is formed on the base substrate 101 having the first, second and third contact holes C1, C2 and C3. The transparent conductive layer 170 makes contact with the drain electrodes DE1 and DE2 through the first and second contact holes C1 and C2, and the transparent conductive layer 170 makes contact with the metal pattern ME through the third contact hole C3.

A negative photoresist is formed on the base substrate 101 having the transparent conductive layer 170. The negative photoresist is patterned by using a mask 510 having a transmissive part 511 and a shielding part 512. The negative photoresist is exposed to light to be cured.

The negative photoresist is cured to form a photoresist pattern PR on the transparent conductive layer 170. The transparent conductive layer 170 is patterned by using the photoresist pattern PR to form the pixel electrodes PE1 and PE2 in the display area DA, and the contact electrode CE in the peripheral area PA.

A photoresist material may not remain in the opening H formed on the boundary area of the first and second areas P1 and P2 by using the negative photoresist, thereby preventing short defects of the pixel electrodes PE1 and PE2.

Referring to FIGS. 2, 3, and 4C, a blocking layer 180 is formed on the base substrate 101 having the pixel electrodes PE1 and PE2, and the contact electrode CE. The blocking layer 180 has a thickness that is capable of forming a supporting member 183 disposed in the display area DA.

A mask 530 is disposed on the base substrate 101 having the blocking layer 180, and the mask 530 has a transmissive part 531, a shield part 532 and a slit part 533. The mask 530 may have a half-transmissive part instead of the slit part 533. The half-transmissive part partially transmits light and partially reflects or absorbs light.

The transmissive part 531 is disposed in the display area DA in which the supporting member 183 is formed, and in the peripheral area PA in which the protruding member 185a is formed, respectively.

The shield part 532 is disposed in the display area DA in which the pixel electrodes PE1 and PE2 are formed. The shield part 532 is disposed in an area in which the blocking layer 180 is not formed.

The slit part 533 is disposed in the display area DA in which the first blocking member 181 is formed. The first blocking member 181 is formed in the opening H. The slit part 533 is disposed in the peripheral area PA in which the second blocking member 185 is formed.

The blocking layer 180 is patterned by using the mask 530 to form the first blocking member 181, the supporting member 183 and the second blocking member 185 having the protruding member 185a. The first blocking member 181 and the supporting member 183 are formed in the display area DA. The second blocking member 185 is formed in the peripheral area PA. When the first blocking member 181 is formed, the supporting member 183 may be formed to simplify a manufacturing process.

In addition, a step between the color filters 161 and 162 adjacent to the first blocking member 181 may be decreased by using the mask 530 having the slit part 533. The second blocking member 185 having a thickness of a desired optical density value may be formed in the peripheral area PA by using the mask 530 having the slit part 533. The second blocking member 185 may block the light reflected from the metal pattern ME and the contact electrode CE of the static electricity prevention circuit and the gate driving circuit.

In addition, the second blocking member 185 and the protruding member 185a may decrease the volume of liquid crystal for filling the liquid crystal layer 300 in the peripheral area PA. Thus, the volume of the liquid crystal for filling the liquid crystal layer 300 in the display area DA may be compensated.

Figure 5:
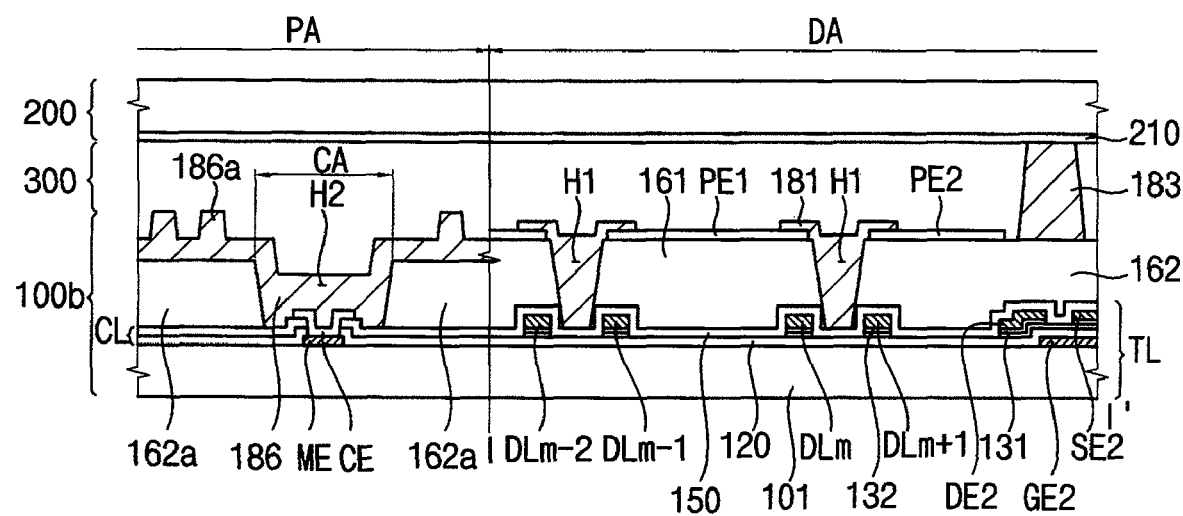
FIG. 5 is a cross-sectional view illustrating a display panel according to an exemplary embodiment of the present invention.

FIG. 5 is a cross-sectional view illustrating a display panel according to an exemplary embodiment of the present invention.

The display panel according to the present exemplary embodiment is substantially the same as the display panel according to the exemplary embodiments shown in FIGS. 1-4C, except for a dummy color filter 162a and a second blocking member 186 formed in the peripheral area PA. Hereinafter, the same reference numerals will be used to refer to the same or like parts, and any further description thereof will be limited.

Referring to FIGS. 2 and 5, the display panel includes a display substrate 100b, the opposing substrate 200 and the liquid crystal layer 300.

The display substrate 100b includes the base substrate 101 comprising the display area DA and the peripheral area PA. The transistor layer TL, the color filters 161 and 162, the pixel electrodes PE1 and PE2, the first blocking member 181 and the supporting member 183 are disposed in the display area DA.

The first blocking member 181 is disposed in a first opening H1 formed on the boundary area of the pixel areas P1 and P2.

The circuit layer CL, the contact electrode CE, the dummy color filter 162a and the second blocking member 186 are disposed in the peripheral area PA.

The circuit layer CL includes a metal pattern ME, the gate insulation layer 120 and the protective layer 150 for forming a static electricity prevention circuit or a gate driving circuit. The metal pattern ME includes the gate metal pattern and the source metal pattern.

The contact electrode CE is electrically connected to the metal pattern ME of the circuit layer CL. The contact electrode CE includes the same material as the pixel electrodes PE1 and PE2.

The dummy color filter 162a is formed on the circuit layer CL, and a second opening H2 is formed through the dummy color filter 162a. A circuit part CA is exposed by the second opening H2, and the circuit part CA includes the static electricity prevention circuit and the gate driving circuit. The dummy color filter 162a may be formed to have a single-layer or a multilayer structure.

A second blocking member 186 is formed on the dummy color filter 162a having the second opening H2. The second blocking member 186 makes direct contact with the contact electrode CE through the second opening H2 to cover the circuit part CA. The second blocking member 186 includes substantially the same material as the first blocking member 181 and the supporting member 183.

The second blocking member 186 blocks the light reflected from the metal pattern ME and the contact electrode CE forming the static electricity prevention circuit and the gate driving circuit to prevent light leakage.

The second blocking member 186 may further include a plurality of protruding members 186a as shown in FIG. 5. The protruding members 186a may decrease the volume of the liquid crystal layer 300 disposed in the peripheral area PA. Thus, the filling characteristics of the liquid crystal layer 300 in consideration of the drop margin of liquid crystal may be improved.

FIGS. 6A to 6D are cross-sectional views illustrating a method for manufacturing the display substrate 100b illustrated in FIG. 5, according to an exemplary embodiment of the present invention.

Figure 6A:
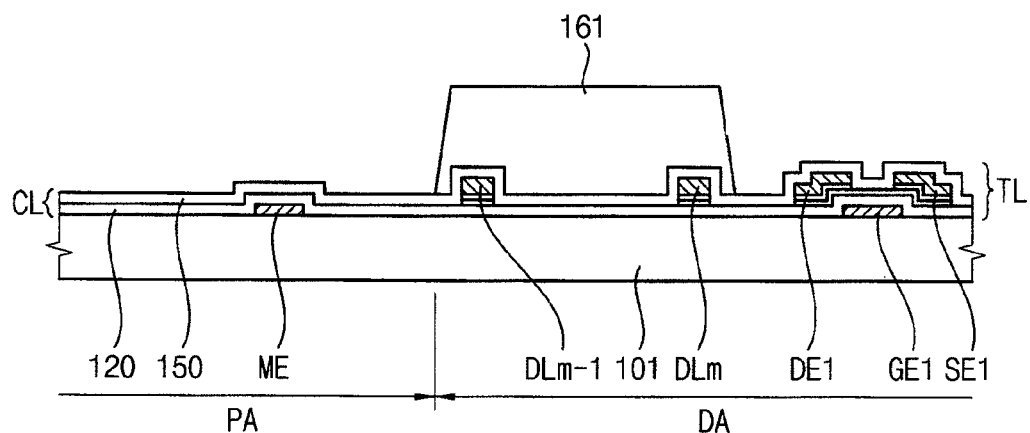
FIGS. 6A to 6D are cross-sectional views illustrating a method for manufacturing a display substrate illustrated in FIG. 5, according to an exemplary embodiment of the present invention.

Referring to FIGS. 2, 5 and 6A, the transistor layer TL is formed in the display area DA of the base substrate 101 and the circuit layer CL is formed in the peripheral area PA of the base substrate 101. The first color filter 161 is formed on the first pixel area P1 of the base substrate 101 having the transistor layer TL and the circuit layer CL.

Figure 6B:
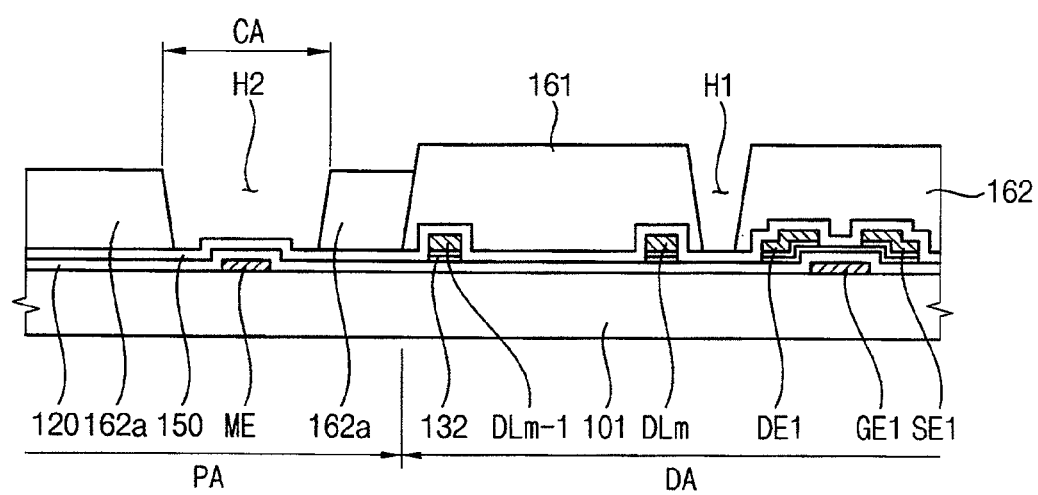

Referring to FIGS. 2, 5 and 6B, the second color filter 162 is formed on the second pixel area P2 of the base substrate 101 having the first color filter 161. The first opening H1 is formed on the boundary area of the first and second pixel areas P1 and P2 having different color filters 161 and 162 in the display area DA. The first opening H1 is extended in the second direction substantially parallel with the data lines DLm−1 and DLm.

A plurality of openings may be further formed through the color filters 161 and 162 in an area in which the first and second contact holes C1 and C2 are formed. The plurality of openings exposes the protective layer 150.

The dummy color filter 162a is formed in the peripheral area PA, and the dummy color filter 162a has the second color. A second opening H2 is formed through the dummy color filter 162a. The second opening H2 exposes the circuit layer CL in the peripheral area PA corresponding to the circuit part CA including the static electricity prevention circuit and the gate driving circuit.

Figure 6C:
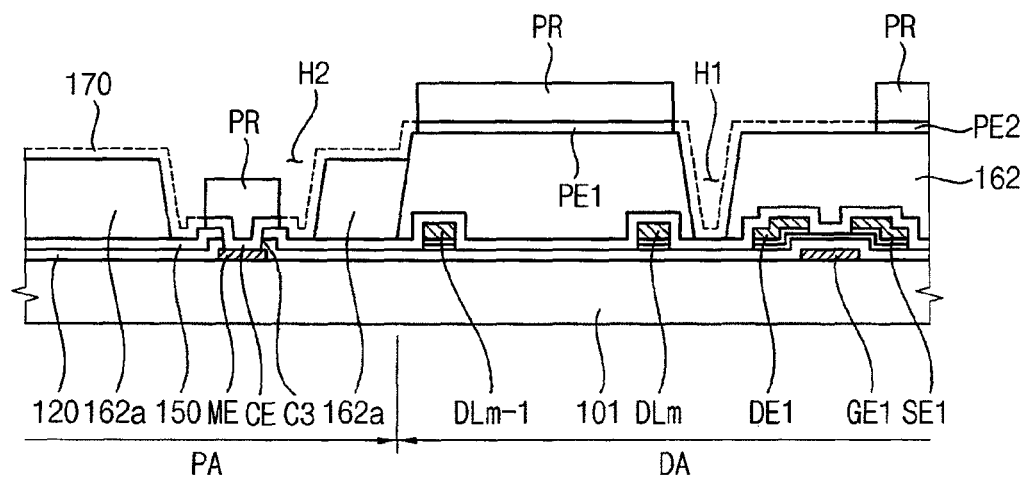

Referring to FIGS. 2, 5 and 6C, the protective layer 150 of the base substrate 101 is etched to form the first and second contact holes C1 and C2 exposing the drain electrodes DE1 and DE2. The protective layer 150 and the gate insulation layer 120 formed in the peripheral area PA are etched to form a third contact hole C3 exposing the metal pattern ME.

A transparent conductive layer 170 is formed on the base substrate 101 having the first, second and third contact holes C1, C2 and C3. A negative photoresist is formed on the base substrate 101 having the transparent conductive layer 170. The transparent conductive layer 170 is patterned by using the photoresist pattern PR to form the pixel electrodes PE1 and PE2 in the display area DA, and the contact electrode CE in the peripheral area PA.

Figure 6D:
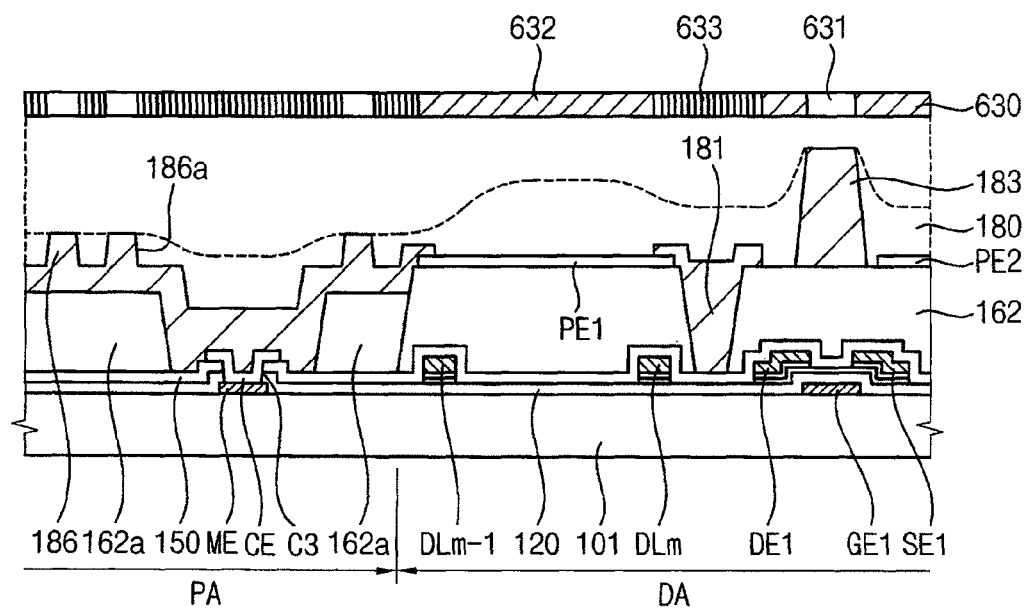

Referring to FIGS. 2, 5 and 6D, the blocking layer 180 is formed on the base substrate 101 having the pixel electrodes PE1 and PE2, and the contact electrode CE. The blocking layer 180 has a thickness that is capable of forming a supporting member 183 disposed in the display area DA. The thickness of the blocking layer 180 formed in the peripheral area PA according to the present exemplary embodiment may be less than the thickness of the blocking layer 180 formed in the peripheral area PA according to the exemplary embodiment shown in FIG. 4C because of the dummy color filter 162a.

A mask 630 is disposed on the base substrate 101 having the blocking layer 180, and the mask 630 has a transmissive part 631, a shield part 632 and a slit part 633. The mask 630 may have a half-transmissive part instead of the slit part 633. The half-transmissive part partially transmits light and partially reflects or absorbs light. The transmissive part 631 is disposed in the display area DA in which the supporting member 183 is formed, and in the peripheral area PA in which the protruding member 186a is formed, respectively.

The shield part 632 is disposed in the display area DA in which the pixel electrodes PE1 and PE2 are formed. The shield part 632 is disposed in an area in which the blocking layer 180 is not formed.

The slit part 633 is disposed in the display area DA in which the first blocking member 181 is formed. The first blocking member 181 is formed in the first opening H1. The slit part 633 is disposed in the peripheral area PA in which the second blocking member 186 is formed.

The blocking layer 180 is patterned by using the mask 630 to form the first blocking member 181, the supporting member 183 and the second blocking member 186 having the protruding member 186a. The first blocking member 181 and the supporting member 183 are formed in the display area DA. The second blocking member 186 is formed in the peripheral area PA. When the first blocking member 181 is formed, the supporting member 183 may be formed to simplify a manufacturing process.

In addition, a step between the color filters 161 and 162 adjacent to the first blocking member 181 may be decreased by using the mask 630 having the slit part 633.

The dummy color filter 162a and the second blocking member 186 are sequentially formed to obtain a desired optical density value. Here, the dummy color filter 162a is formed to have a single-layer structure; however, the dummy color filter 162a may be formed to have a multilayer structure having different color filters for obtaining the desired optical density value.

In addition, the second blocking member 186 may block the light reflected from the metal pattern ME and the contact electrode CE of the static electricity prevention circuit and the gate driving circuit.

In addition, the second blocking member 186 and the protruding member 186a may decrease the volume of liquid crystal for filling the liquid crystal layer 300 in the peripheral area PA. Thus, the volume of the liquid crystal for filling the liquid crystal layer 300 in the display area DA may be compensated.

Figure 7:
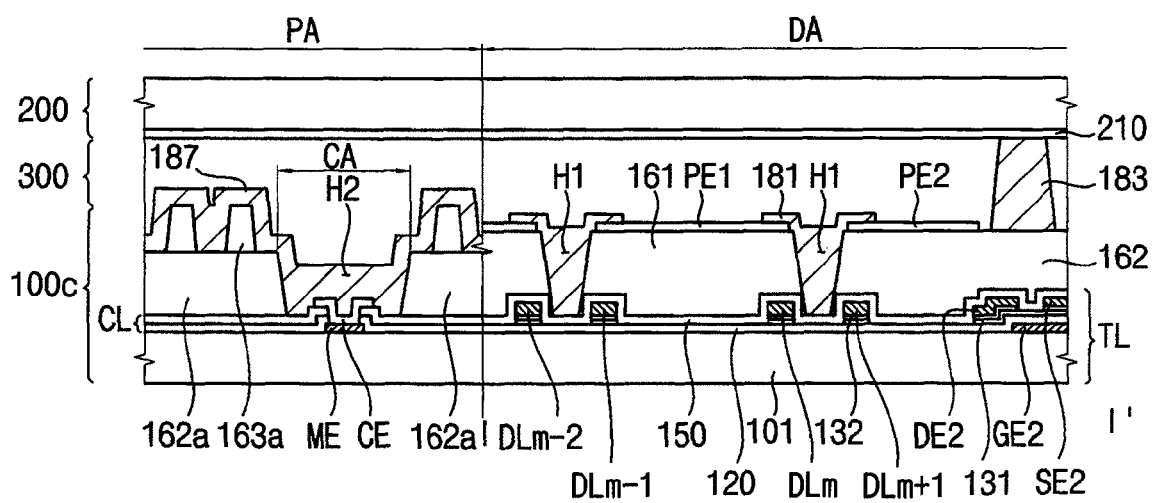
FIG. 7 is a cross-sectional view illustrating a display panel according to an exemplary embodiment of the present invention.

FIG. 7 is a cross-sectional view illustrating a display panel according to an exemplary embodiment of the present invention.

The display panel according to the present exemplary embodiment is substantially the same as the display panel according to the exemplary embodiments shown in FIGS. 1-4C, except for a dummy color filter 162a and a second blocking member 187 formed in the peripheral area PA. Hereinafter, the same reference numerals will be used to refer to the same or like parts, and any further description thereof will be limited.

Referring to FIGS. 2 and 7, the display panel includes a display substrate 100c, the opposing substrate 200 and the liquid crystal layer 300.

The display substrate 100c includes the base substrate 101 including the display area DA and the peripheral area PA. The transistor layer TL, the color filters 161 and 162, the pixel electrodes PE1 and PE2, the first blocking member 181 and the supporting member 183 are disposed in the display area DA. The first blocking member 181 is disposed in a first opening H1 formed on the boundary area defined between different color filters 161 and 162.

The circuit layer CL, the contact electrode CE, the dummy color filter 162a, a color protruding member 163a and the second blocking member 186 are disposed in the peripheral area PA.

The circuit layer CL includes a metal pattern ME, the gate insulation layer 120 and the protective layer 150 for forming a static electricity prevention circuit or a gate driving circuit. The metal pattern ME includes the gate metal pattern and the source metal pattern.

The contact electrode CE is electrically connected to the metal pattern ME of the circuit layer CL. The contact electrode CE includes substantially the same material as the pixel electrodes PE1 and PE2.

The dummy color filter 162a is formed on the circuit layer CL, and a second opening H2 is formed in the dummy color filter 162a. A circuit part CA is exposed through the second opening H2, and the circuit part CA includes the static electricity prevention circuit and the gate driving circuit. The dummy color filter 162a may be formed to have a single-layer or a multilayer structure.

A plurality of color protruding members 163a is formed on the dummy color filter 162a, and the color protruding members 163a may have an embossed shape. The color protruding members 163a may decrease the volume of liquid crystal for filling the liquid crystal layer 300 disposed in the peripheral area PA. Thus, the volume of the liquid crystal for filling the liquid crystal layer 300 disposed in the display area DA may be compensated.

The second blocking member 187 is formed in the peripheral area PA to cover the dummy color filter 162a having the second opening H2 and the color protruding member 163a. The second blocking member 187 blocks the light reflected from the metal pattern ME and the contact electrode CE forming the static electricity prevention circuit and the gate driving circuit to prevent light leakage.

Figure 8A:
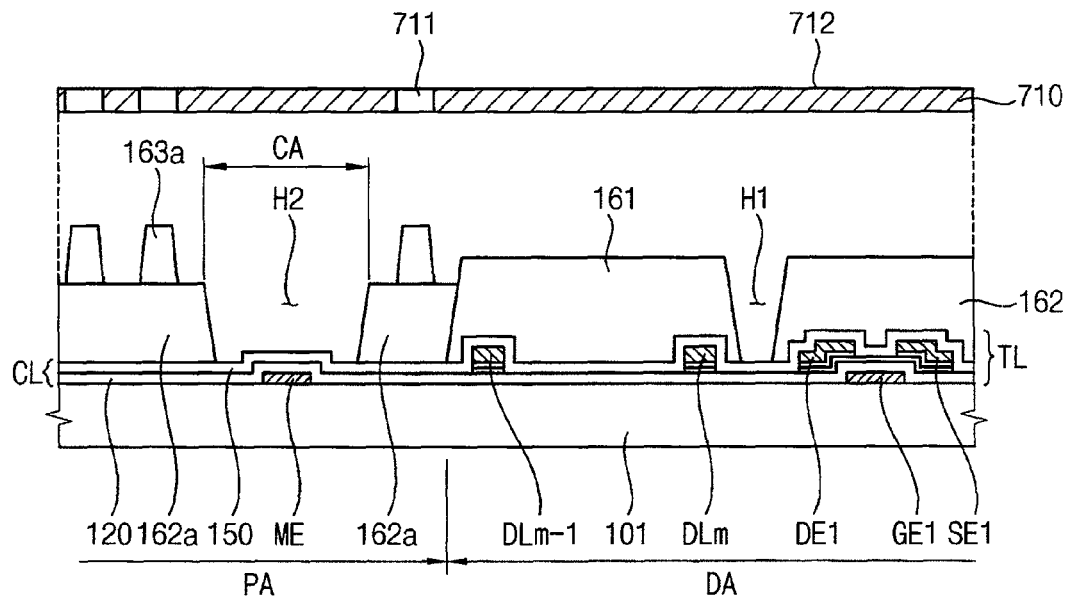
FIGS. 8A and 8B are cross-sectional views illustrating a method for manufacturing a display substrate illustrated in FIG. 7, according to an exemplary embodiment of the present invention.
Figure 8B:
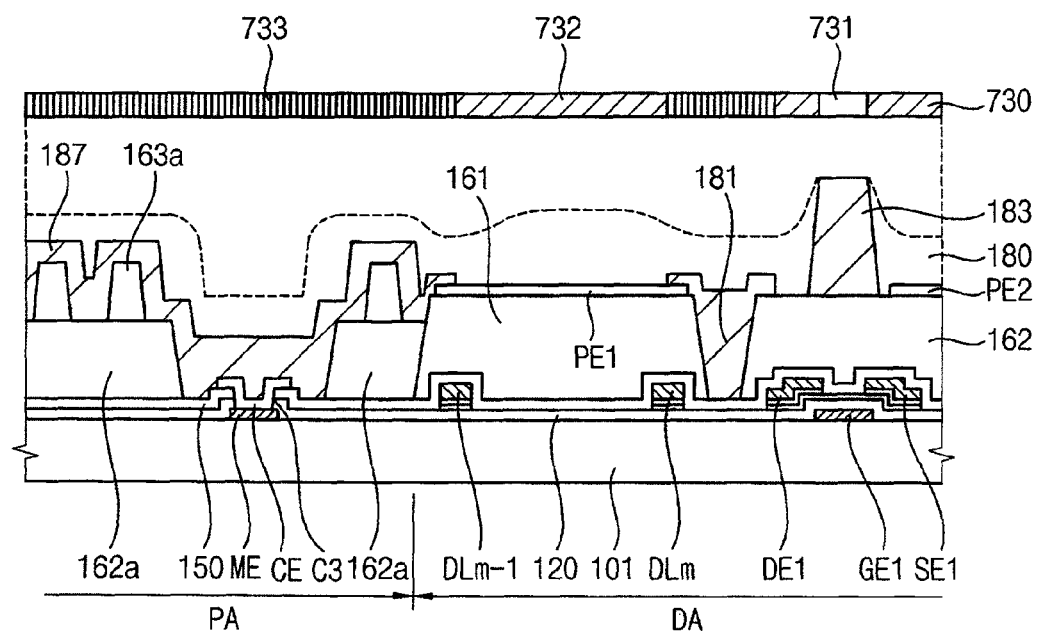

FIGS. 8A and 8B are cross-sectional views illustrating a method for manufacturing the display substrate 100c illustrated in FIG. 7, according to an exemplary embodiment of the present invention.

Referring to FIGS. 2, 7 and 8A, the transistor layer TL and the color filters 161 and 162 are formed in the display area DA of the base substrate 101. The circuit layer CL and the dummy color filter 162a are formed in the peripheral area PA of the base substrate 101. The first opening H1 is formed on the boundary area between different color filters 161 and 162 in the display area DA. The second opening H2 is formed in the peripheral area PA corresponding to the circuit part CA including the static electricity prevention circuit and the gate driving circuit.

A color photoresist layer 163 having a third color is formed on the base substrate 101 having the first and second openings H1 and H2.

The color photoresist layer 163 is patterned by using a mask 710 having a transmissive part 711 and a shield part 712 to form a third color filter and the color protruding members 163a. For example, the third color filter of the third color may be formed in a pixel area corresponding to the third color in the display area DA. The color protruding members 163a are formed on the dummy color filter 162a in the peripheral area PA.

Referring to FIGS. 2, 7 and 8B, the pixel electrodes PE1 and PE2, and the contact electrode CE are formed on the base substrate 101 having the color protruding member 163a. Thereafter, the blocking layer 180 is formed on the base substrate 101.

The blocking layer 180 has a thickness that is capable of forming a supporting member 183 disposed in the display area DA. The thickness of the blocking layer 180 formed in the peripheral area PA according to the present exemplary embodiment may be less than the thickness of the blocking layer 180 formed in the peripheral area PA according to the exemplary embodiments shown in FIGS. 4C and 6D because of the dummy color filter 162a and the color protruding member 163a.

A mask 730 is disposed on the base substrate 101 having the blocking layer 180, and the mask 730 has a transmissive part 731, a shield part 732 and a slit part 733. The mask 730 may have a half-transmissive part instead of the slit part 633. The half-transmissive part partially transmits light and partially reflects or absorbs light.

The transmissive part 731 is disposed in the display area DA in which the supporting member 183 is formed.

The shield part 732 is disposed in the display area DA in which the pixel electrodes PE1 and PE2 are formed. The shield part 632 is disposed in an area in which the blocking layer 180 is not formed.

The slit part 733 is disposed in the display area DA in which the first blocking member 181 is formed. The first blocking member 181 is formed in the first opening H1. The slit part 633 is disposed in the peripheral area PA in which the second blocking member 186 is formed.

The blocking layer 180 is patterned by using the mask 730 to form the first blocking member 181, the supporting member 183 and the second blocking member 187. When the first blocking member 181 is formed, the supporting member 183 may be formed to simplify a manufacturing process.

In addition, a step between the color filters 161 and 162 adjacent to the first blocking member 181 may be decreased by using the mask 730 having the slit part 733.

The dummy color filter 162a and the second blocking member 187 are sequentially formed to obtain a desired optical density value. Here, the dummy color filter 162a is formed to have a single-layer structure; however, the dummy color filter 162a may be formed to have a multilayer structure having different color filters for obtaining the desired optical density value.

In addition, the color protruding member 163a may decrease the volume of liquid crystal for filling the liquid crystal layer 300 in the peripheral area PA. Thus, the volume of the liquid crystal for filling the liquid crystal layer 300 in the display area DA may be compensated.

In addition, the second blocking member 187 may block the light reflected from the metal pattern ME and the contact electrode CE of the static electricity prevention circuit and the gate driving circuit.

Figure 9:
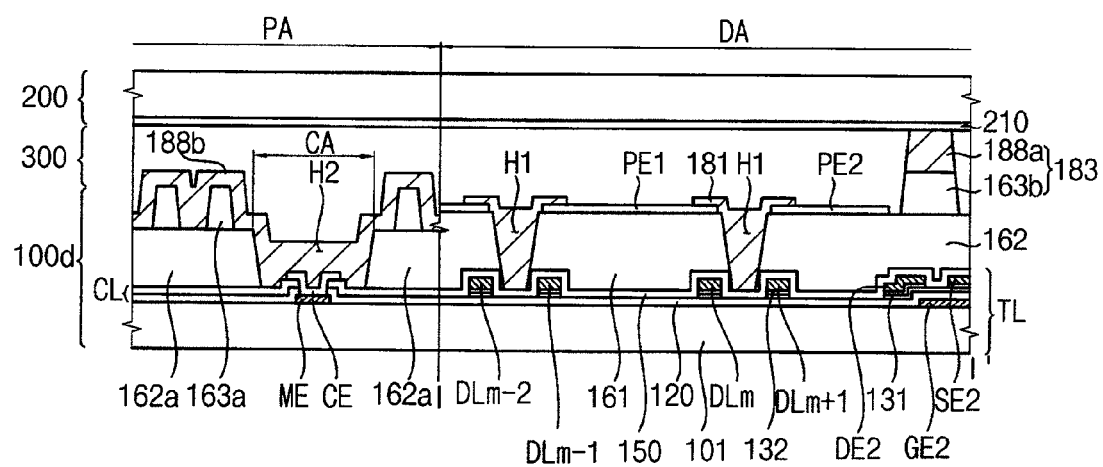
FIG. 9 is a cross-sectional view illustrating a display panel according to an exemplary embodiment of the present invention.

FIG. 9 is a cross-sectional view illustrating a display panel according to an exemplary embodiment of the present invention.

The display panel according to the present exemplary embodiment is substantially the same as the display panel according to the exemplary embodiments shown in FIGS. 7-8B, except for a supporting member 183 formed in the display area DA. Hereinafter, the same reference numerals will be used to refer to the same or like parts, and any further description thereof will be limited.

Referring to FIGS. 2 and 9, the display panel includes a display substrate 100d, the opposing substrate 200 and the liquid crystal layer 300.

The display substrate 100d includes the base substrate 101 including the display area DA and the peripheral area PA. The transistor layer TL, the color filters 161 and 162, the pixel electrodes PE1 and PE2, the first blocking member 181 and the supporting member 183 are disposed in the display area DA. The supporting member 183 includes a color pattern 163b and a blocking member 188a, and the supporting member 183 has a multilayer structure.

The circuit layer CL, the contact electrode CE, the dummy color filter 162a, the color protruding member 163a and the second blocking member 188b are disposed in the peripheral area PA. The dummy color filter 162a may be formed to have a single-layer or a multilayer structure.

A plurality of color protruding members 163a are formed on the dummy color filter 162a, and the color protruding members 163a may have an embossed shape. The color protruding members 163a may decrease the volume of liquid crystal for filling the liquid crystal layer 300 disposed in the peripheral area PA. Thus, the volume of the liquid crystal for filling the liquid crystal layer 300 disposed in the display area DA may be compensated.

The second blocking member 188b is formed in the peripheral area PA to cover the dummy color filter 162a having the second opening H2 and the color protruding member 163a. The second blocking member 188b blocks the light reflected from the metal pattern ME and the contact electrode CE forming the static electricity prevention circuit and the gate driving circuit to prevent light leakage.

Figure 10A:
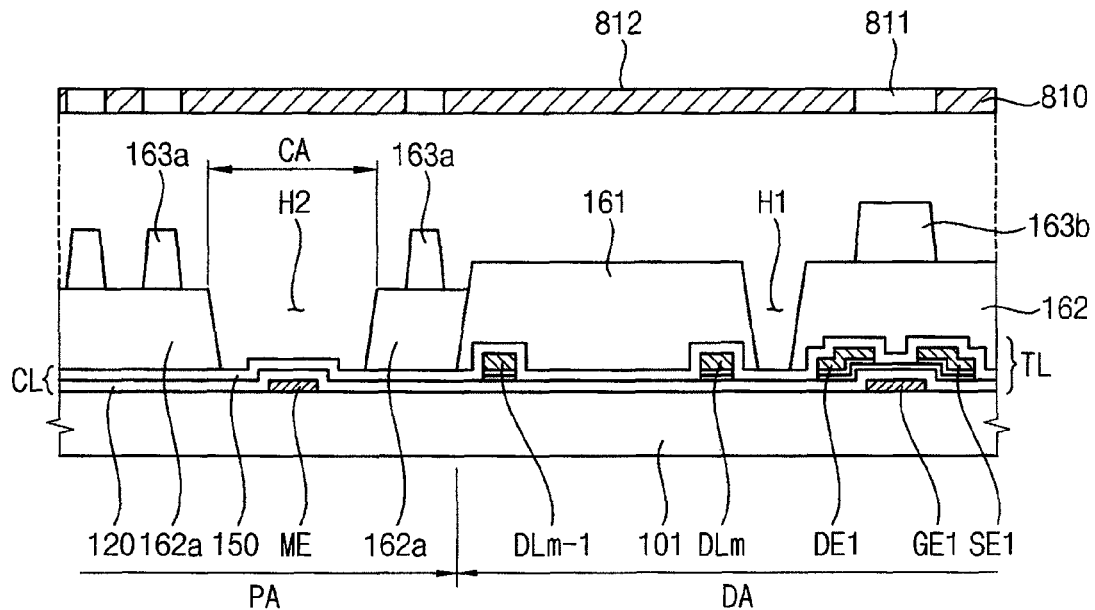
FIGS. 10A and 10B are cross-sectional views illustrating a method for manufacturing a display substrate illustrated in FIG. 9, according to an exemplary embodiment of the present invention.
Figure 10B:
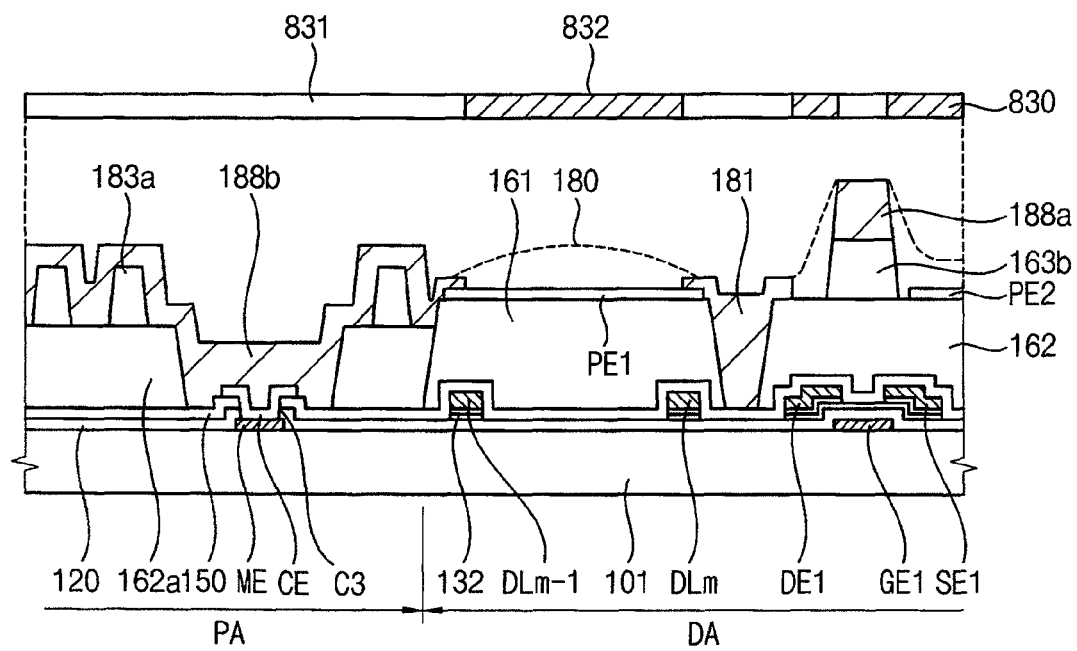

FIGS. 10A and 10B are cross-sectional views illustrating a method for manufacturing the display substrate 100d illustrated in FIG. 9, according to an exemplary embodiment of the present invention.

Referring to FIGS. 2, 9 and 10A, the transistor layer TL and the color filters 161 and 162 are formed in the display area DA of the base substrate 101. The circuit layer CL and the dummy color filter 162a are formed in the peripheral area PA of the base substrate 101.

A color photoresist layer 163 having a third color is formed on the base substrate 101 having the first and second openings H1 and H2.

The color photoresist layer 163 is patterned by using a mask 810 having a transmissive part 811 and a shield part 812 to form a third color filter and the color protruding members 163a. For example, the color photoresist layer 163 may be patterned to form the color protruding members 163a in the peripheral area PA. The color protruding members 163a are formed on the dummy color filter 162a. The color photoresist layer 163 is patterned to form a third color filter and the color pattern 163b in the display area DA. The color pattern 163b is formed in the display area DA in which the supporting member 183 is formed. The color pattern 163b is a part of the supporting member 183.

Referring to FIGS. 2, 9 and 10B, the pixel electrodes PE1 and PE2 and the contact electrode CE are formed on the base substrate 101 having the color protruding member 163a and the color pattern 163b.

The blocking layer 180 is formed on the base substrate 101 having the pixel electrodes PE1 and PE2 and the contact electrode CE. The blocking layer 180 has a thickness that is capable of forming a supporting member 183 disposed in the display area DA. The supporting member 183 includes the color pattern 163b, so that the blocking layer 180 is formed while considering the thickness of the color pattern 163b.

The thickness of the blocking layer 180 formed in the display area DA according to the present exemplary embodiment may be less than the thickness of the blocking layer 180 formed in the display area DA according to the exemplary embodiments shown in FIGS. 4C, 6D and 8B. The thickness of the blocking layer 180 formed in the peripheral area PA according to the present exemplary embodiment may be less than the thickness of the blocking layer 180 formed in the peripheral area PA according to the exemplary embodiments shown in FIGS. 4C, 6D and 8B.

A mask 830 is disposed on the base substrate 101 having the blocking layer 180, and the mask 830 has a transmissive part 831 and a shield part 832. The thickness of the blocking layer 180 according to the present exemplary embodiment is less than the thickness of the blocking layer 180 according to the exemplary embodiments shown in FIGS. 4C, 6D and 8B. Thus, the mask 830 does not include the slit part like the masks of the exemplary embodiments shown in FIGS. 4C, 6D and 8B.

The transmissive part 831 is disposed in the display area DA in which the first blocking member 181 and the supporting member 183 are formed. The transmissive part 831 is disposed in the peripheral area PA.

The shield part 832 is disposed in the display area DA in which the pixel electrodes PE1 and PE2 are formed. The shield part 832 is disposed in an area in which the blocking layer 180 is not formed.

The blocking layer 180 is patterned to form the first blocking member 181 and the blocking member 188a of the supporting member 183 in the display area DA. The blocking layer 180 is patterned to form the second blocking member 188b in the peripheral area PA.

The supporting member 183 includes the color pattern 163b and the blocking member 188a. The color pattern 163b is formed when the color filters 161 and 162 are patterned. The blocking member 188a is formed when the blocking layer 180 is patterned.

Thus, a mask for forming the supporting member 183 may be omitted to simplify a manufacturing process. The blocking layer 180 is thin, so that a step of the color filters 161 and 162 adjacent to the first blocking member 181 may be decreased.

The dummy color filter 162a and the second blocking member 188b are sequentially formed to obtain a desired optical density value. Here, the dummy color filter 162a is formed to have a single-layer structure; however, the dummy color filter 162a may be formed to have a multilayer structure having different color filters for obtaining the desired optical density value.

In addition, the color protruding member 183a may decrease the volume of liquid crystal for filling the liquid crystal layer 300 in the peripheral area PA. Thus, the volume of the liquid crystal for filling the liquid crystal layer 300 in the display area DA may be compensated.

In addition, the second blocking member 188b may block the light reflected from the metal pattern ME and the contact electrode CE of the static electricity prevention circuit and the gate driving circuit.

Figure 11:
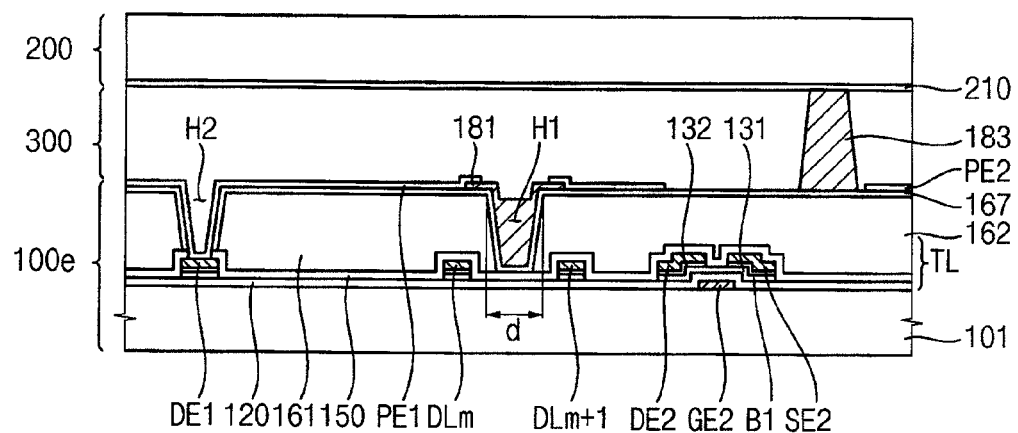
FIG. 11 is a cross-sectional view taken along line II-I' in FIG. 2.

FIG. 11 is a cross-sectional view taken along line II-I' in FIG. 2.

Referring to FIGS. 1, 2 and 11, the display panel includes a display substrate 100e, the opposing substrate 200, and the liquid crystal layer 300. The opposing substrate 200 includes the common electrode layer 210.

A transistor layer TL, a plurality of color filters 161 and 162, a blocking member 181, a supporting member 183 and a plurality of pixel electrodes PE1 and PE2 are formed on the base substrate 101.

The color filters 161 and 162 are formed on the transistor layer TL corresponding to the pixel areas P1 and P2 of the base substrate 101, respectively. The first color filter 161 has a first color, and the second color filter 162 has a second color different from the first color. A first opening H1 is formed on a boundary area between the first and second color filters 161 and 162 to expose the protective layer 150. For example, the color filters 161 and 162 on the boundary area of the pixel areas P1 and P2 may be removed to form the first opening H1 between m-th data line DLm and (m+1)-th data line DLm+1. A distance d between the first color filter 161 and the second color filter 162 is about 0 μm<d< about 15 μm. The color filters 161 and 162 are removed in an area in which the first contact hole C1, the second contact hole C2 and the storage line STL are formed to form a plurality of second openings H2.

A capping layer 167 is formed on the base substrate 101 having the color filters 161 and 162 formed thereon, so that the capping layer 167 covers the color filters 161 and 162. The capping layer 167 blocks impurity ions and outgassing generated from the color filters 161 and 162. The capping layer 167 may include silicon nitride, silicon oxide, etc. The capping layer 167 covers an upper face and a side face of the color filters 161 and 162.

The blocking member 181 is disposed in the first opening H1 formed on the boundary area of the pixel areas P1 and P2. The blocking member 181 divides the pixel areas P1 and P2 having different color filters 161 and 162. The first blocking member 181 includes a light-blocking material.

The supporting member 183 is formed on the color filter 162 to maintain a gap between the display substrate 100e and the opposing substrate 200. For example, the supporting member 183 may be formed on the color filter 162 corresponding to the n-th gate line GLn. Otherwise, the supporting member 183 is formed in an area in which the gate metal pattern and the source metal pattern are formed. The supporting member 183 includes substantially the same material as the first blocking member 181. The thickness of the supporting member 183 may be similar to the thickness of the blocking member 181, or may be greater than the thickness of the blocking member 181.

The pixel electrodes PE1 and PE2 are formed on the capping layer 167 corresponding to the pixel areas P1 and P2. The pixel electrodes PE1 and PE2 are formed on the capping layer 167, so that adhesion between the pixel electrodes PE1 and PE2 and the color filters 161 and 162 may be improved. Thus, a fine pattern such as a micro-slit pattern may be formed in the pixel electrodes PE1 and PE2.

For example, an end of a first pixel electrode PE1 may partially cover the blocking member 181 that covers the capping layer 167 in an area in which the m-th data line DLm is disposed. An end of a second electrode PE2 partially covers the blocking member 181 that covers the capping layer 167 in an area in which the (m+1)-th data line DLm+1 is disposed. The first and second pixel electrodes PE1 and PE2 are divided into a first sub-electrode 171 and a second sub-electrode 172 to divide a domain, in which the liquid crystal is aligned, to form a multidomain structure.

As shown, the first and second sub-electrodes 171 and 172 may be patterned to have a chevron shape, respectively. The first sub-electrode 171 is electrically connected to the drain electrode DE1 of the first transistor TR1 through the contact hole C1. The second sub-electrode 172 is electrically connected to the drain electrode DE2 of the second transistor TR2 through the contact hole C2.

FIGS. 12A to 12E are cross-sectional views illustrating a method for manufacturing the display substrate 100e illustrated in FIG. 11, according to an exemplary embodiment of the present invention.

Figure 12A:
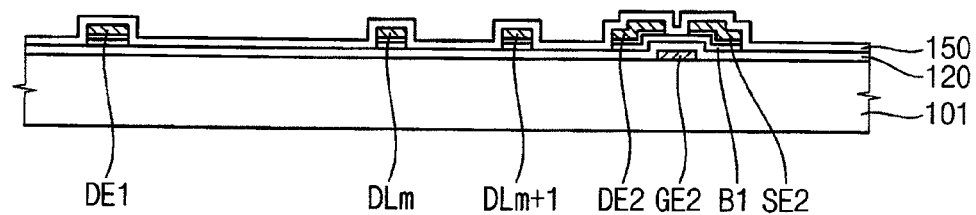
FIGS. 12A to 12E are cross-sectional views illustrating a method for manufacturing a display substrate illustrated in FIG. 11, according to an exemplary embodiment of the present invention.

Referring to FIGS. 11 and 12A, a gate metal layer is formed on the base substrate 101. The gate metal layer is patterned to form the gate metal pattern. The gate metal pattern includes the n-th gate line GLn, the gate electrodes GE1 and GE2, and the storage line STL formed on the base substrate 101. The gate insulation layer 120 is formed on the base substrate 101 having the gate metal pattern formed thereon.

A channel layer and a source metal layer are sequentially formed on the base substrate 101 having the gate insulation layer 120 formed thereon. The channel layer and the source metal layer are patterned by using one mask to form the source metal pattern disposed on the gate insulation layer 120 and the channel patterns 131 and 132 disposed under the source metal pattern.

The source metal pattern includes the data lines DLm−1 and DLm, the source electrodes SE1 and SE2, and the drain electrodes DE1 and DE2. The first channel pattern 131 is formed under the source electrodes SE1 and SE2, and the drain electrodes DE1 and DE2. The second channel pattern 132 is formed under the data lines DLm−1 and DLm. The protective layer 150 is formed on the base substrate 101 having the source metal pattern.

Figure 12B:
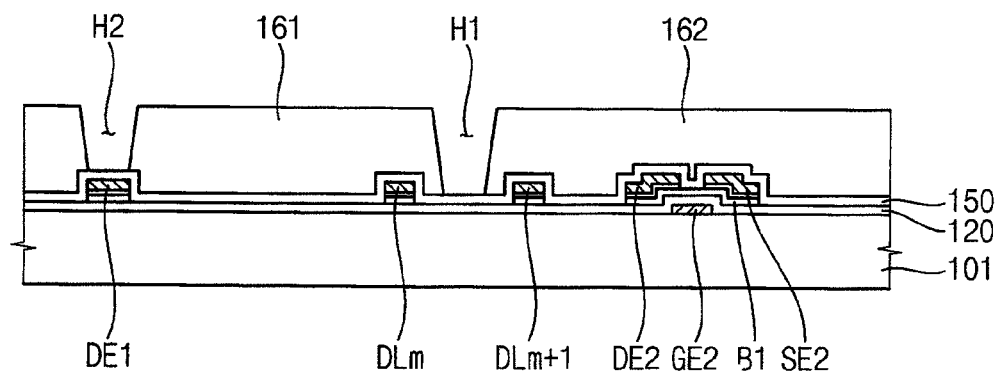

Referring to FIGS. 11 and 12B, the color filters 161 and 162 are formed on the base substrate 101 having the transistor layer TL formed thereon. For example, a first color filter 161 having a first color may be formed on the first pixel area P1. After the first color filter 161 is formed, a second color filter 162 having a second color is formed on the second pixel area P2. The first opening H1 is formed on the boundary area of the first and second pixel areas P1 and P2 having different color filters 161 and 162. The color filters 161 and 162 on the boundary area are removed to form the first opening H1. The first opening H1 is extended in the second direction substantially parallel with the data lines DLm−1 and DLm.

The second openings H2 are formed on the color filters 161 and 162 in an area in which the first and second contact holes C1 and C2 are formed. The second openings H2 expose the protective layer 150.

Figure 12C:
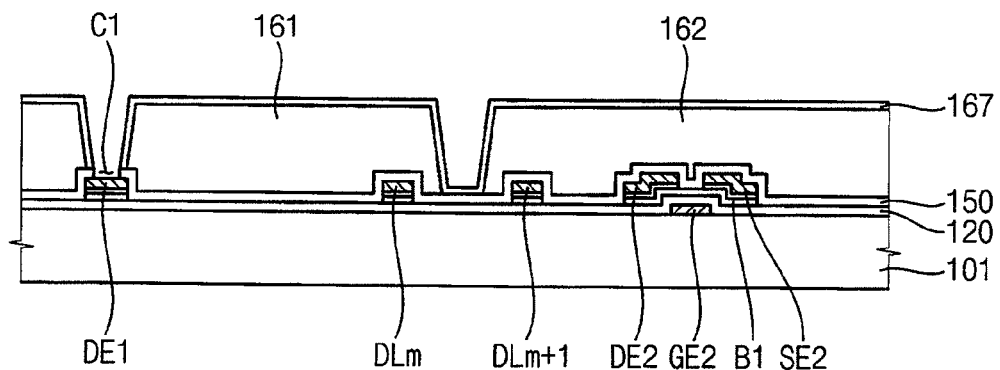

Referring to FIGS. 11 and 12C, the capping layer 167 is formed on the base substrate 101 having the first and second openings H1 and H2 formed thereon. The capping layer 167 is formed on the color filters 161 and 162 to cover the upper and side faces of the color filters 161 and 162. The capping layer 167 blocks impurity ions and outgassing generated from the color filters 161 and 162. The capping layer 167 may include silicon nitride, silicon oxide, etc.

Thereafter, the protective layer 150 and the capping layer 167 are etched by an etching process, so that the first and second contact holes C1 and C2 exposing the drain electrodes DE1 and DE2 are formed.

Figure 12D:
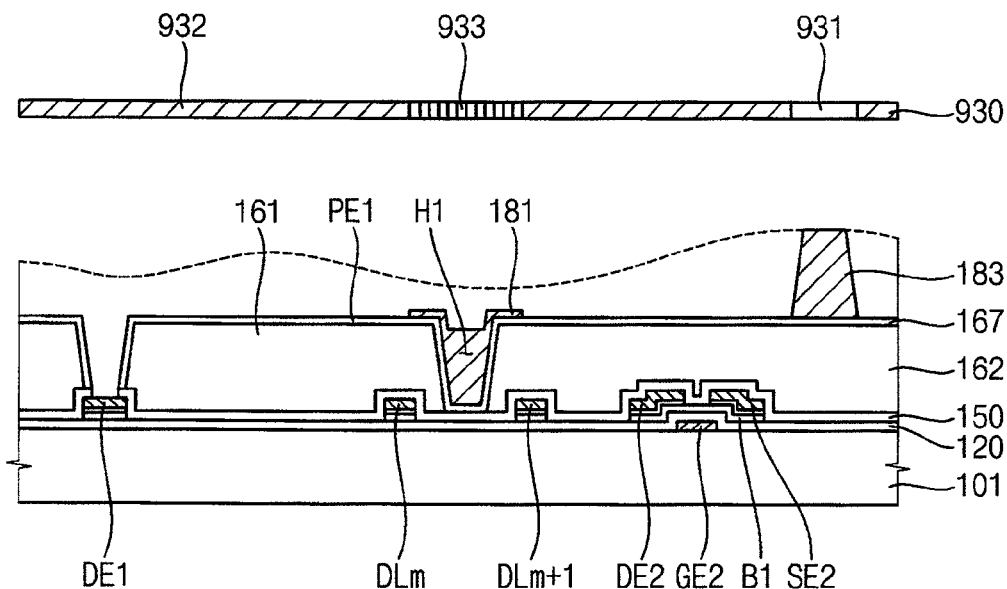

Referring to FIGS. 11 and 12D, a blocking layer 180 is formed on the base substrate 101 having the first and second contact holes C1 and C2 formed thereon. The blocking layer 180 has a thickness that is capable of forming the supporting member 183.

A mask 930 is disposed on the base substrate 101 having the blocking layer 180, and the mask 930 has a transmissive part 931, a shield part 932 and a slit part 933. The mask 930 may have a half-transmissive part instead of the slit part 933. The half-transmissive part partially transmits light and partially reflects or absorbs light.

The transmissive part 931 is disposed in an area in which the supporting member 183 is formed. The shield part 932 is disposed in an area in which the pixel electrodes PE1 and PE2 are formed. The shield part 932 is disposed in an area in which the blocking layer 180 is not formed. The slit part 933 is disposed in an area in which the blocking member 181 is formed. The blocking member 181 is formed in the first opening H1.

The blocking layer 180 is patterned by using the mask 930 to form the blocking member 181 and the supporting member 183. When the blocking member 181 is formed, the supporting member 183 may be formed to simplify a manufacturing process. In addition, a step of the color filters 161 and 162 adjacent to the blocking member 181 may be decreased by using the mask 930 having the slit part 933.

Figure 12E:
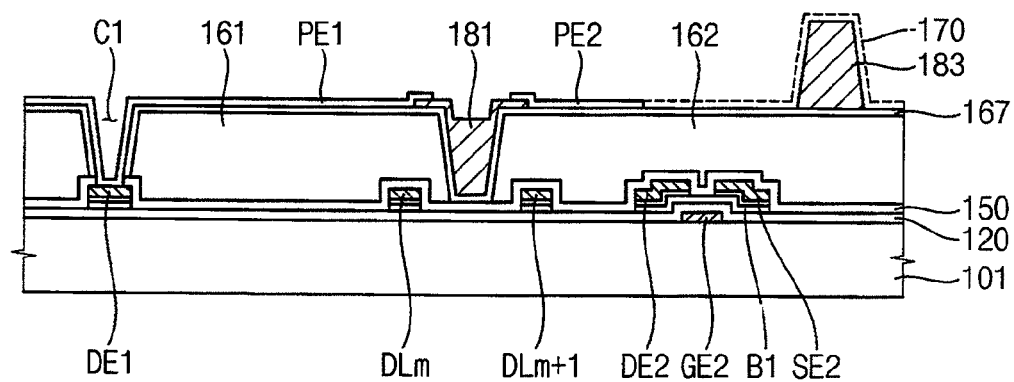

Referring to FIGS. 11 and 12E, a transparent conductive layer 170 is formed on the base substrate 101 having the blocking member 181 and the supporting member 183 formed thereon. The transparent conductive layer 170 may include indium tin oxide (ITO), indium zinc oxide (IZO), etc. The transparent conductive layer 170 makes contact with the drain electrodes DE1 and DE2 through the first and second contact holes C1 and C2, and makes direct contact with the capping layer 167. The adhesion strength between the transparent conductive layer 170 and an inorganic layer such as the capping layer 170 may be greater than the adhesion strength between the transparent conductive layer 170 and an organic layer such as the color filters 161 and 162.

The transparent conductive layer 170 is patterned to form the pixel electrodes PE1 and PE2 in the pixel areas P1 and P2. For example, the first pixel electrode PE1 may make contact with the capping layer 167 formed on the first pixel area P1. An end of a first pixel electrode PE1 partially covers the blocking member 181 that covers the capping layer 167 in an area in which the m-th data line DLm is disposed. The second pixel electrode PE2 makes direct contact with the capping layer 167 formed on the second pixel area P2. An end of a second electrode PE2 partially covers the blocking member 181 that covers the capping layer 167 in an area in which the (m+1)-th data line DLm+1 is disposed. The first and second pixel electrodes PE1 and PE2 are divided into a first sub-electrode 171 and a second sub-electrode 172 to respectively divide a domain, in which the liquid crystal is aligned, to form a multidomain structure.

As shown, the first and second sub-electrodes 171 and 172 may be patterned to have a chevron shape, respectively. The first sub-electrode 171 is electrically connected to the drain electrode DE1 of the first transistor TR1 through the contact hole C1. The second sub-electrode 172 is electrically connected to the drain electrode DE2 of the second transistor TR2 through the contact hole C2.

Therefore, the first blocking member 181 and the supporting member 183 are formed from substantially the same material and through substantially the same process to simplify a manufacturing process. The contact holes C1 and C2 are formed by the etching process before the supporting member 183 is formed, so that the supporting member 183 may be prevented from being etched. The pixel electrodes PE1 and PE2 are directly formed on the capping layer 167, so that a micro-slit pattern may be formed in the pixel electrodes PE1 and PE2

Hereinafter, the display substrate 100e according to the exemplary embodiment shown in FIG. 11 will be described with comparison to display substrates 100f and 100g in FIGS. 13 and 14, respectively. The display substrates 100f and 100g are comparative examples. The same reference numerals will be used to refer to the same or like parts.

Figure 13:
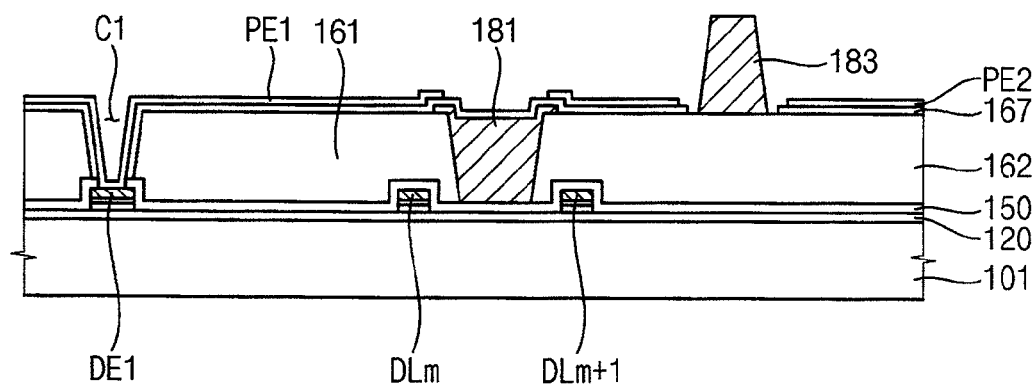
FIG. 13 is a cross-sectional view illustrating a display substrate for comparison with the display substrate illustrated in FIG. 11.

FIG. 13 is a cross-sectional view illustrating the display substrate 100f of comparative example 1. Referring to FIG.

13, the blocking member 181 and the supporting member 183 were formed on the base substrate 101, after the transistor layer TL and the color filters 161 and 162 were formed on the base substrate 101. The capping layer 167 was formed on the base substrate 101 having the blocking member 181, the supporting member 183, and the color filters 161 and 162 formed thereon. The contact hole C1 was formed by etching the capping layer 167 and the protective layer 150. When the capping layer 167 and the protective layer 150 were etched, the capping layer 167 formed on the supporting member 183 was etched. Thereafter, the pixel electrodes PE1 and PE2 were formed on the base substrate 101.

According to comparative example 1, the blocking member 181 and the supporting member 183 were formed before the contact hole C1 was formed by the etching process. In the etching process, the capping layer 167 formed on the supporting member 183 was etched. Thus, a portion of the supporting member 183 was etched in the etching process. As the height of the supporting member 183 is reduced, liquid crystal filling characteristics may be deteriorated. In addition, the cell gaps of the liquid crystal layer may not be uniform.

Figure 14:
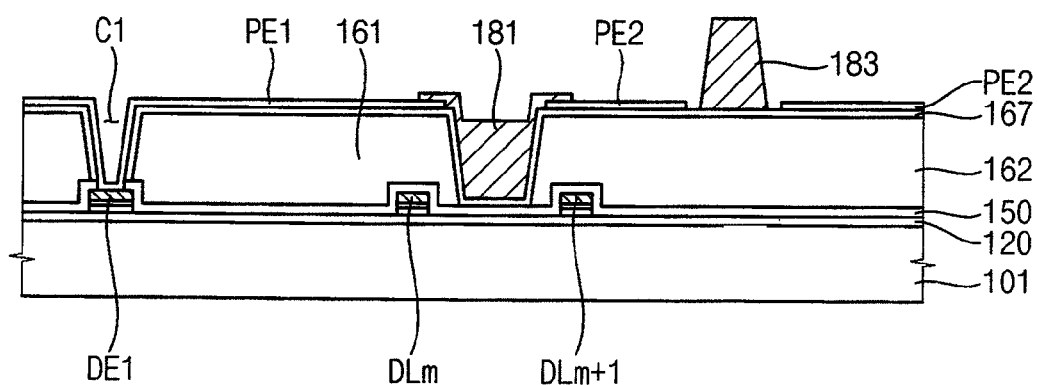
FIG. 14 is a cross-sectional view illustrating a display substrate for comparison with the display substrate illustrated in FIG. 11.

FIG. 14 is a cross-sectional view illustrating display substrate 100g of comparative example 2. Referring to FIG. 14, the capping layer 167 was formed on the base substrate 101, after the transistor layer TL and the color filters 161 and 162 were formed on the base substrate 101. The contact hole C1 was formed by etching the capping layer 167 and the protective layer 150. After the contact holes C1 and C2 are formed, the pixel electrodes PE1 and PE2 were formed. The blocking member 181 and the supporting member 183 were formed on the base substrate 101 having the pixel electrodes PE1 and PE2 thereon.

According to comparative example 2, the blocking member 181 and the supporting member 183 were formed after the pixel electrodes PE1 and PE2 were formed. Therefore, the distance between the data lines DLm and DLm+1 and the pixel electrodes PE1 and PE2 was reduced in comparison with an exemplary embodiment of the present invention and comparative example 1, so that a coupling capacitance between the data lines DLm and DLm+1 and the pixel electrodes PE1 and PE2 was increased. The pixel electrodes PE1 and PE2 were patterned by using a negative photoresist material to prevent shorts between the pixel electrodes PE1 and PE2 in an area between the color filters 161 and 162.

The characteristics of the display substrates of according to the exemplary embodiment shown in FIG. 11, comparative example 1 and comparative example 2 are illustrated in Table 1 below.

Referring to Table 1, in the display substrate 100f of comparative example 1, the supporting member 183 was formed before the contact hole C1 was formed by the etching process. Thus, the supporting member 183 was damaged, which caused a step.

In the display substrate 100g of comparative example 2, the distance between the data lines DLm and DLm+1 and the pixel electrodes PE1 and PE2 was reduced to increase the coupling capacitance. The blocking member 181 and the color filters 161 and 162 had uneven flatness, so that defects such as vertical crosstalk were caused. In addition, residue of the blocking member 181 and the supporting member 183 remained on the pixel electrodes PE1 and PE2 of the display substrate 100g of comparative example 2.

However, the display substrate 100e according to the exemplary embodiment shown in FIG. 11 did not cause defects such as the above-mentioned vertical crosstalk, residue of the blocking material, damage to the supporting member 183, etc.

According to exemplary embodiments of the present invention, a first blocking member and a supporting member are formed from substantially the same material and through substantially the same process to simplify a manufacturing process. A static electricity prevention circuit and a gate driving circuit are covered to block light reflected from a metal pattern and a contact electrode of the static electricity prevention circuit and the gate driving circuit. A protruding member disposed in a peripheral area is formed when a color filter and blocking members are formed. Thus, the filling characteristics of liquid crystal may be improved.

Furthermore, the supporting member is formed after a contact hole is formed. Thus, damage to the supporting member in a subsequent process may be prevented. A capping layer is formed between the color filter and a pixel electrode. Thus, the adhesion strength between the pixel electrode and the capping layer may be improved.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:
1. A display substrate, comprising:
a transistor layer including a transistor connected to a gate line and a data line crossing the gate line, wherein the transistor is disposed in a display area of a base substrate;
a plurality of color filters disposed on the transistor layer and formed in a pixel area of the base substrate;

TABLE 1

| | Exemplary embodiment shown in FIG. 11 | Comparative example 1 | Comparative example 2 | Remarks |
| --- | --- | --- | --- | --- |
| Vertical crosstalk | ○ | ○ | X | Comparative example 2: uneven flatness, increased coupling capacitance |
| Residual blocking material | ○ | ○ | X | Comparative example 2: residue on the pixel electrode |
| Damage to the supporting member | ○ | X | ○ | Comparative example 1: height difference of the supporting member | a first blocking member disposed between different color filters, wherein the first blocking member blocks light;

a supporting member maintaining a distance between the base substrate and a substrate facing the base substrate, wherein the supporting member includes a blocking member comprising substantially the same material as the first blocking member;
a circuit part disposed in a peripheral area surrounding the display area, wherein the circuit part includes a metal pattern and a contact electrode in contact with the metal pattern;
a second blocking member comprising substantially the same material as the first blocking member, wherein the second blocking member covers the circuit part; and
a protruding member comprising substantially the same material as the second blocking member, wherein the protruding member is integrally formed with the second blocking member.

2. The display substrate of claim 1, wherein a thickness of the supporting member is substantially similar to or greater than a thickness of the first blocking member.

3. The display substrate of claim 1, wherein the second blocking member directly covers the circuit part.

4. The display substrate of claim 1, wherein the circuit part further includes a static electricity prevention circuit.

5. The display substrate of claim 1, wherein the circuit part further includes a gate driving circuit.

6. The display substrate of claim 1, further comprising:
a dummy color filter disposed between the base substrate and the second blocking member and having an opening in an area in which the circuit part is formed.

7. The display substrate of claim 1, wherein the protruding member comprises substantially the same material as at least one of the color filters.

8. The display substrate of claim 7, wherein the protruding member is disposed between the second blocking member and the dummy color filter.

9. The display substrate of claim 8, wherein the supporting member comprises substantially the same material as at least one of the color filters, and the supporting member includes a color pattern disposed between the blocking member thereof and at least one of the color filters.

10. The display substrate of claim 1, further comprising:
a capping layer covering an upper face and a side face of the color filters; and
a pixel electrode directly disposed on the capping layer, wherein the first blocking member is disposed on the capping layer between different color filters, and an end of the pixel electrode is overlapped with the first blocking member.

11. The display substrate of claim 10, wherein the supporting member is disposed on the capping layer in an area in which at least one of the color filters is formed.

12. A method of manufacturing a display substrate, comprising:
forming a transistor layer in a display area of a base substrate and a circuit layer in a peripheral area surrounding the display area, wherein the transistor layer includes a transistor connected to a gate line and a data line crossing the gate line, and the circuit layer includes a metal pattern of a circuit part;
forming a plurality of color filters on the transistor layer in a pixel area of the base substrate; and
forming a first blocking member disposed between different color filters, a supporting member disposed on at least one of the color filters, and a second blocking member covering the circuit part.

13. The method of claim 12, further comprising:
forming a pixel electrode on at least one of the color filters and a contact electrode in contact with the metal pattern, before forming the first blocking member, the supporting member and the second blocking member.

14. The method of claim 13, wherein the second blocking member is integrally formed with a protruding member.

15. The method of claim 14, wherein forming the first blocking member, the supporting member, the second blocking member and the protruding member comprises:
forming a blocking layer on the base substrate having the pixel electrode and the contact electrode formed thereon; and
patterning the blocking layer using a mask, wherein the mask includes a transmissive part disposed corresponding to the protruding member and the supporting member, and a slit part disposed corresponding to the first blocking member and the second blocking member covering the circuit part.

16. The method of claim 13, further comprising:
forming a dummy color filter between the base substrate and the second blocking member, wherein the dummy color filter has an opening corresponding to an area in which the circuit part is formed.

17. The method of claim 16, wherein the second blocking member is integrally formed with a protruding member, and the second blocking member covers the circuit part through the opening.

18. The method of claim 17, wherein forming the first blocking member, the supporting member, the second blocking member and the protruding member comprises:
forming a blocking layer on the base substrate having the pixel electrode and the contact electrode formed thereon; and
patterning the blocking layer using a mask, wherein the mask includes a transmissive part disposed corresponding to the protruding member and the supporting member, and a slit part disposed corresponding to the first blocking member and the second blocking member covering the circuit part.

19. The method of claim 16, further comprising:
forming a color protruding member on the dummy color filter.

20. The method of claim 19, wherein the second blocking member covers the color protruding member and the dummy color filter, and the second blocking member covers the circuit part through the opening.

21. The method of claim 20, wherein forming the first blocking member, the supporting member, the second blocking member and the color protruding member comprises:
forming a blocking layer on the base substrate having the pixel electrode and the contact electrode formed thereon; and
patterning the blocking layer using a mask, wherein the mask includes a transmissive part disposed corresponding to the supporting member, and a slit part disposed corresponding to the first blocking member, the color protruding member and the second blocking member covering the dummy color filter.

22. The method of claim 19, wherein forming the color protruding member comprises forming a color supporting member on at least one of the color filters.

23. The method of claim 22, wherein forming the second blocking member comprises forming a blocking member on the color supporting member to form the supporting member.

24. The method of claim 12, further comprising:
forming a capping layer on the base substrate having the color filters formed thereon, wherein the capping layer covers an upper face and a side face of the color filters; and
forming a pixel electrode on the base substrate having the first blocking member and the supporting member formed thereon, wherein the pixel electrode is directly disposed on the capping layer, and
wherein the first blocking member is disposed on the capping layer between different color filters, and an end of the pixel electrode is overlapped with the first blocking member.

25. The method of claim 24, wherein the supporting member is formed on the capping layer in an area in which at least one of the color filters is formed.

26. The method of claim 24, wherein forming the transistor layer comprises:
forming the gate line on the base substrate;
forming a gate insulation layer on the base substrate having the gate line formed thereon;
forming the data line crossing the gate line, a source electrode connected to the data line and a drain electrode spaced apart from the source electrode on the base substrate having the gate insulation layer formed thereon; and
forming a protective layer on the base substrate having the drain electrode formed thereon.

27. The method of claim 26, wherein forming at least one of the color filters comprises:
forming an opening exposing the protective layer in an area in which the drain electrode is formed.

28. The method of claim 27, further comprising:
etching the protective layer and the capping layer corresponding to the opening to form a contact hole exposing the drain electrode, wherein the pixel electrode is electrically connected to the drain electrode through the contact hole.

29. The method of claim 28, wherein the contact hole is formed before the supporting member is formed.

30. The method of claim 24, wherein the pixel electrode includes a first sub-electrode and a second sub-electrode spaced apart from the first sub-electrode.

* * * * *